United States Patent [19]

Stokken

[11] 4,365,294
[45] Dec. 21, 1982

[54] MODULAR TERMINAL SYSTEM USING A COMMON BUS

[75] Inventor: Richard A. Stokken, Attleboro, Mass.

[73] Assignee: Nizdorf Computer Corporation, Burlington, Mass.

[21] Appl. No.: 138,957

[22] Filed: Apr. 10, 1980

[51] Int. Cl.³ .................. G06F 15/16; G06F 13/00
[52] U.S. Cl. ................................................ 364/200
[58] Field of Search .................. 364/200 MS File; 340/825

[56] References Cited

U.S. PATENT DOCUMENTS

| | | | |
|---|---|---|---|
| 3,700,873 | 10/1972 | Yhap | 364/200 X |
| 4,035,777 | 7/1977 | Moreton | 364/200 |
| 4,059,851 | 11/1977 | Nutter, Jr. et al. | 364/200 |
| 4,079,354 | 3/1978 | Nitta | 340/825 |
| 4,127,896 | 11/1978 | Raslavsky | 364/200 |
| 4,130,865 | 12/1978 | Heart et al. | 364/200 |
| 4,161,024 | 7/1979 | Joyce et al. | 364/200 |
| 4,167,781 | 9/1979 | Beccia et al. | 364/200 |

OTHER PUBLICATIONS

"Interface Timeout", IBM Technical Disclosure, vol. 22, No. 1, Jun. 1979, pp. 302, 303.
"Technology", Electronic Design 23, Nov. 8, 1977.
"Multiprocessing System Mixes 8-and 16-Bit Microcomputers" Computer Design, vol. 19, (1980), Feb., No. 2, Tulsa, Okla.
LSI Streamlines Instrument Interface With Standard IEEE-488 Bus Electronics, vol. 52, No. 9, (1979-04).

*Primary Examiner*—Raulfe B. Zache
*Attorney, Agent, or Firm*—Krass, Young & Schivley

[57] ABSTRACT

A modular terminal system (10) employs a CPU module (22) connected via a bus (20) to at least one slave module (24, 26, 28, 32, 36). An error condition is detected if a slave module fails to respond to a command by generating an operation acknowledge signal within a predetermined period of time associated with the time required for the slave module to execute the command.

A memory mapping device (74) is utilized to decode CPU address signals and generate related signals on a greater number of output lines coupled to the system bus thereby increasing the number of addressable locations otherwise accessible by the CPU.

Improved prioritized bus communication is provided by way of a vectored interrupt scheme (210) in which a priority line (212) is coupled in a daisy chain fashion to other slave modules in the system.

In the preferred embodiment the system employs distributed CPU modules (22, 24) employing an interprocessor interrupt technique utilizing a pair of commonly accessible storage devices (300, 302). One of the processors may be used as an emulator and a programmable logic array (406) is advantageously utilized in the emulator processor.

67 Claims, 23 Drawing Figures

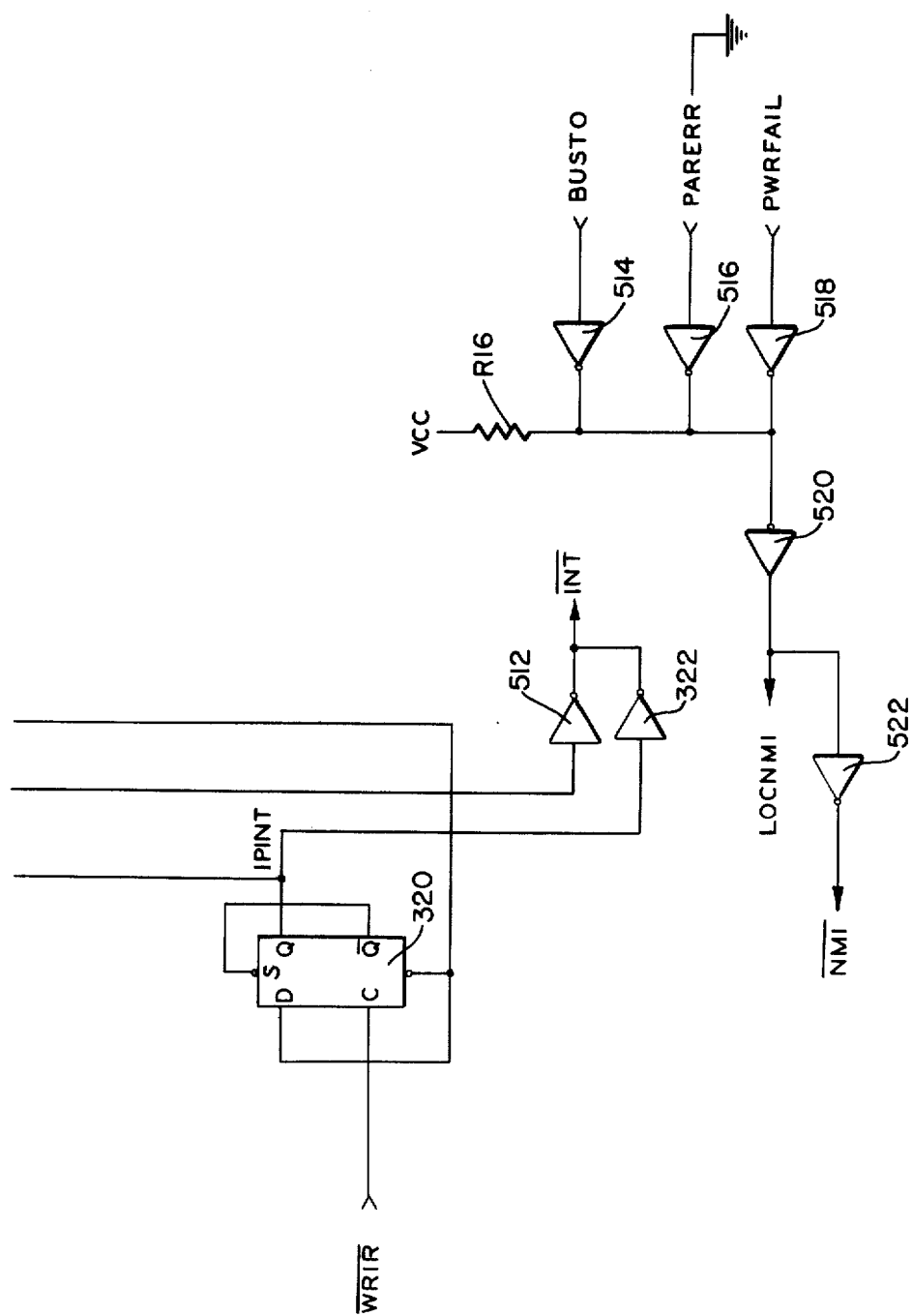

MODULAR TERMINAL SYSTEM USING A COMMON BUS

Description

TECHNICAL FIELD

This invention relates generally to data processors and more particularly to microprocessor based terminals.

BACKGROUND ART

Electronic data processing systems have evolved from large, cumbersome devices using vacuum tubes to compact and inexpensive microprocessor based devices utilizing large scale integrated circuitry. In recent years, much effort has been placed upon increasing the flexibility of the computer system while at the same time minimizing its costs. It has been recognized that this criteria can be met by using a modular approach in which the capabilities of the data processing system can be expanded or changed merely by adding new circuit boards which contain circuitry for performing different functions. Intel Corporation's MULTIBUS system is illustrative of this approach. It contains a single system bus through which each functional module communicates with each other. In general, the system includes a central processing unit (CPU) on one circuit board and a plurality of different slave modules which interface with different peripheral units such as displays, printers, etc.

One of the problems associated with this modular technique is that it is extremely important for the CPU, which is located on one circuit board, to keep track of the operational status of the slave modules which are on other circuit boards. In the Intel MULTIBUS system, when the CPU wants the slave module to perform an operation, it places the address of the slave module on the system bus. The slave module must respond to the CPU within an extremely short period of time to indicate to the CPU that the slave module is not capable of performing any further operations at that time. In particular, the slave module must indicate this "Not Ready" condition within about 50 nanoseconds. In order to maintain this rigid timing requirement, high cost components must be used. Moreover, these high speed devices utilize a substantial amount of power thereby further increasing system costs. In addition to these disadvantages, the prior art approach has difficulty in ascertaining "off board" error conditions. This is because the CPU assumes that the operation was completed by the slave module if it did not receive the "Not Ready" signal from the slave module within the allotted time. Consequently, if the slave module interconnection to the system bus is malfunctioning or if the slave module is not plugged into the system at all, the CPU will assume that the operation was complete and proceed to perform other tasks. This, of course, leads to improper system operation.

DISCLOSURE OF THE INVENTION

The present invention is directed to providing an improved modular data processing system characterized in increased functional flexibility, lower costs, and better reliability than those systems known in the art. The present invention includes a multiplicity of unique features which cooperate to provide a uniquely configured system which meets this demanding criteria.

According to one aspect of this invention, at least one CPU and at least one slave module is included in the system, each communicating with each other by way of a single system bus. Both the CPU and slave module have uniquely configured bus interface logic. The CPU bus interface supplies address, data, and control signals over the bus to the slave module to initiate a particular command operation. The slave module bus interface supplies an Operation Acknowledge signal to the CPU over the bus after a predetermined delay time associated with the time necessary for the slave module to complete the commanded operation. The CPU includes wait and bus time out means for detecting when the Operation Acknowledge signal from the slave module has not been received within a predetermined time period. Accordingly, the CPU will not perform other system tasks, under the assumption that the slave module has completed the commanded operation, unless the Operation Acknowledge signal has been received over the bus within the allotted time. Preferably, detection of the bus time out error causes an interrupt of the CPU which puts the current contents of its program counter onto a stack. Thus, the system records the operation which was attempted to be performed before the error condition was detected, thereby permitting a wide variety of user programmed interrupt service routines to correct or log the error. A visual indication on the slave module is provided to indicate to the service technician that this fault is the cause of the system malfunction.

According to another feature of this invention, the CPU includes a memory mapping means coupled between selected address lines from a microprocessor in the CPU and the dedicated address lines of the system bus. The memory mapping means decodes the signals on the microprocessor address lines and generates related signals on a greater number of address lines which are coupled to the system bus thereby expanding the number of memory locations that would otherwise be accessible by the CPU. In a particular embodiment, the memory mapping means is a programmable read only memory (PROM) having a dedicated "Board Select" line for indicating whether the address desired to be accessed by the CPU is on the same circuit board or on a different board. In order to decrease memory access times and reduce errors, the CPU includes local random access memory (RAM) and programmable read only memory (PROM) which are directly connected to the on board data and address lines from the CPU microprocessor. The Board Select line and a given number of output lines from the memory mapping means are coupled to the input of a memory field selector. The field selector is enabled when the Board Selector signal indicates on board memory selection, with the given output lines from the memory mapping means providing a code for selecting a particular on board memory device. A subset of the output lines from the memory mapping means serves as memory typing signals which provide an indication of whether RAM or PROM is to be accessed so that the system may be adjusted accordingly. In the preferred embodiment, the memory typing lines are coupled to a controller means for delaying further activation of the CPU for a given delay time depending upon whether on board RAM or PROM is accessed. Preferably, the controller means is a programmable logic array (PLA) having a plurality of inputs including the RAM or PROM memory typing signals and the Board Select signal coming from the memory mapping means. If either of these inputs is asserted, the PLA provides a particular count signal to the Wait and Bus Time Out means logic. If on board RAM or PROM is selected, the count will correspond to the time necessary for the CPU to access the particular memory device. If the Board Select line indicates an off board operation, the count defines the bus time out delay. In the case of an off board operation necessitating the use of the system bus, the CPU bus interface logic switches the system control PLA into another mode such that its output lines subsequently supply control signals to the system bus. Consequently, the output lines from the system control PLA provide a dual function; first, to load the particular count signal in the Wait and Bus Time Out means logic and, second, to provide control signals to the system bus after the particular count has been loaded.

Still another feature of this invention includes a serial priority daisy chain bus mastership arbitration scheme. Each module having the capability to control the bus is called a "Bus Master". Each Bus Master includes a bus priority line which is serially connected with other Bus Masters in the daisy chain. If a higher priority device is not currently asserting its bus priority line, the module may take control of the bus by asserting a "Busy" signal on the bus. After the command operation is completed, the module relinquishes control over the bus by deasserting the Busy line. However, the Busy line is the last line to be deasserted with respect to the Bus Priority line, Address, Data, Control, and Operation Acknowledge signals of the current bus cycle. A bus "hang" condition will occur if during a bus cycle, a slave device asserts its Operation Acknowledge signal in response to a command but never deasserts it after the deassertion of the command. A bus hang condition overrides a bus time out condition by the fact that the Operation Acknowledge signal is not deasserted and does not allow Busy to be deasserted by the current Bus Master.

In addition to the bus priority arbitration scheme, the present invention further includes a vectored interrupt priority arbitration scheme which is utilized by selected modules. Each module with this vectored interrupt capability includes an interrupt priority line serially coupled in a daisy chain fashion to each slave module in the order of priority. Each module includes a first storage device for asynchronously storing an indication that the particular module has requested an interrupt of the CPU. A second storage device transfers the Interrupt Request signal to a priority gating means upon receipt of a CPU machine cycle clock signal. The priority gating means then changes state. The output of the priority gating means is coupled to the input of the interrupt priority line of the succeeding module. Consequently, all lower priority devices are prevented from generating their own interrupt requests. The output of the second storage device is also coupled to an enable gating means which will place a multibit vector on the bus to the CPU upon receipt of a subsequently generated Interrupt Acknowledge signal over the system bus from the CPU. Accordingly, only the module having its second storage device set will place its multibit vector on the system bus to the CPU thereby preventing higher priority modules from disturbing the ordered system operation once the second storage device has been set. The CPU will then carry out an instruction associated with the vector from the interrupting module.

The preferred embodiment of this invention utilizes distributive processing techniques having a plurality of separate CPU's performing particular tasks. One aspect of this invention includes a unique communication technique for controlling interprocessor communication. Each processor includes two dedicated I/O registers referred to as a response port and an interrupt register. The calling CPU writes its own unique response port address into the response port of the target CPU. The target CPU locks the address into its response port if it is capable of performing an interprocessor command thereby preventing different CPU's from writing into its response port. The calling CPU then reads the code in the response port of the target CPU to determine whether the calling CPU's address was permitted to be written into the response port of the target CPU. If so, the calling CPU loads a multibit vector into the interrupt register of the target CPU. This causes the target CPU to be interrupted. During the interrupt cycle, the target CPU reads the content of its interrupt register and performs a programmed instruction located at an address which is a function of the vector stored in the interrupt register. Once the target CPU has completed the commanded operation, its response port is unlocked so that it is capable of receiving codes from other CPU's. Preferably, the system includes a slave module containing a memory with a plurality of memory locations. A predetermined range of memory locations are commonly accessible by all of the CPU's whereby the target CPU may place data therein in response to the interrupt request from the calling CPU which may, in turn, thereafter read it for further use.

According to yet another feature of this invention, one of the CPU's is used to emulate a host system such that the terminal may be used in an intelligent, off line mode for applications such as data entry and word processing. Enhancement means are provided in the emulator processor for facilitating prompt execution of codes written for another type of system, for example, for a sixteen bit computer system, on the eight bit microprocessor making up the emulator processor. Preferably, the ehancement means includes a first latch for storing the first eight bits of the sixteen bit instruction code and a second latch for storing the subsequent eight bits of the sixteen bit instruction code. A programmable logic array coupled to the outputs of both latches converts the input signals to an eight bit pointer to code executable on the eight bit emulator processor. Accordingly, the software required to decode the sixteen bit instruction is substantially minimized.

BRIEF DESCRIPTION OF THE DRAWINGS

These and other advantages of the present invention will become apparent upon reading the following specification and by reference to the drawings in which.

BEST MODE FOR CARRYING OUT THE INVENTION

I. System Overview

Figure 1:
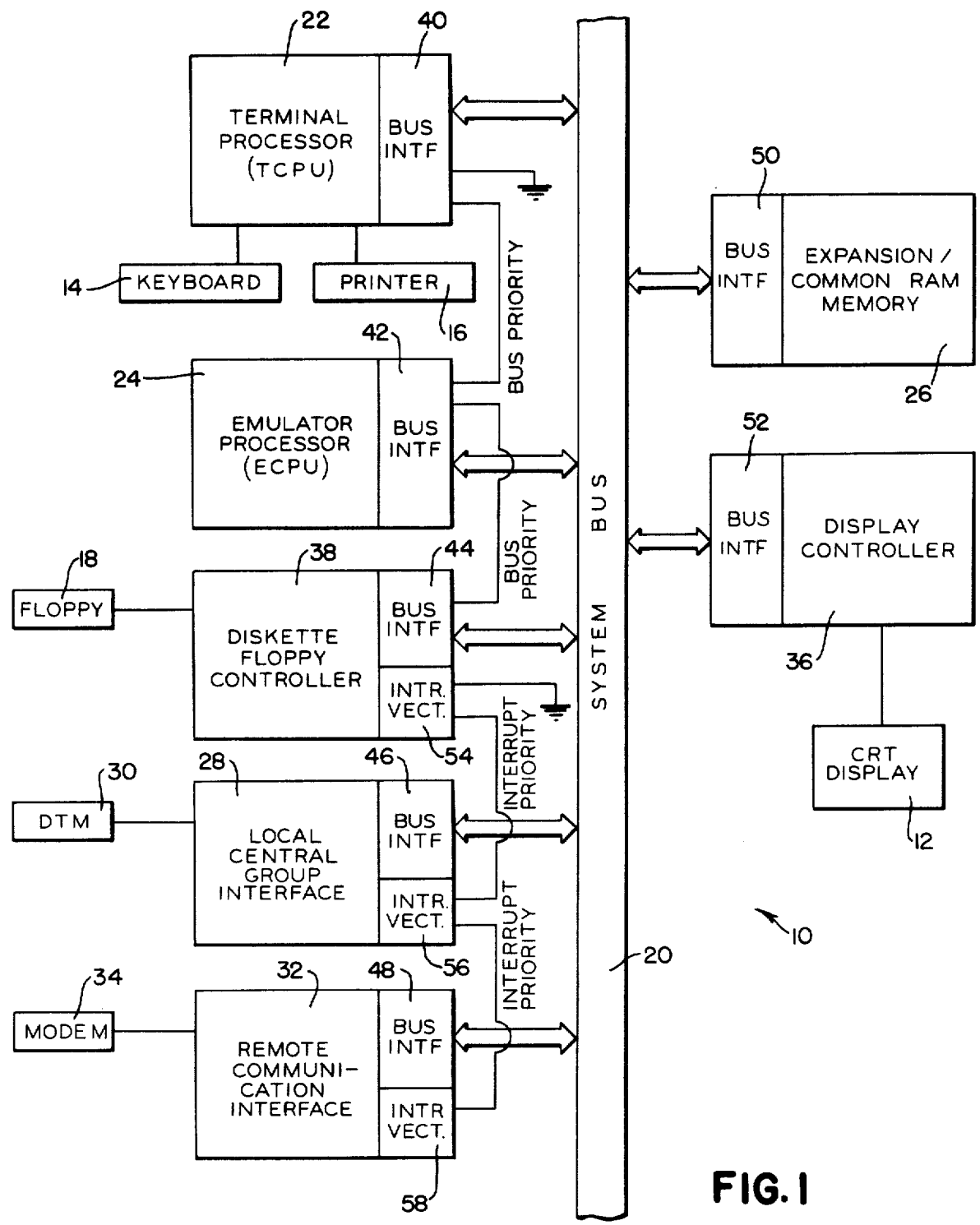
FIG. 1 is a system block diagram of the preferred embodiment of the invention.

The modular terminal 10 shown in FIG. 1 is a microprocessor-based, bus-oriented terminal system of a highly modular nature which allows various terminal configurations and operating modes to be easily implemented from a standard set of hardware modules and terminal resident program packages.

The terminal system 10 may be used on-line or off-line, in intelligent or nonintelligent modes, in batch or interactive modes, either locally or remotely attached to a host system, or with foreign host systems—all depending on how the terminal system and host system are configured.

The hardware modules are designed to support a minimum system configuration of a cathode ray tube display 12, a keyboard 14, and associated I/O interface circuitry. In addition to the minimum configuration, other peripheral devices such as printer 16 and diskettes or floppy memory 18 drives are also easily supported.

The generalized structures of the single system bus 20 of terminal 10 allows easy modification of the system configuration through the addition and/or deletion of hardware and software modules. The bus 20 structure provides for inclusion of additional modules within the system without any change to existing modules or the bus 20 structure. The bus 20 carries a single bus clock from which strobes for all of the modules are derived. Each of the modules shown in FIG. 1 are contained on separate circuit boards such that they can be easily plugged into bus 20.

In the preferred embodiment, a terminal processor unit (TCPU) 22 and its associated microcode is the executive controlling element of the terminal 10. It is responsible for controlling all peripheral slave devices on the terminal bus 20, as well as the emulator processing unit (ECPU) 24, if present.

The EPCU 24 and its associated microcode is a slave device to the TCPU 22. The primary function of ECPU 24 is to emulate a host system such that terminal 10 may be used in an intelligent, off-line mode for applications such as data entry and word processing.

Interprocessor communication is provided via programmed I/O transfers and a window of commonly accessible expansion memory 26 for data transfer. A bidirectional interrupt facility allows each processor to alert the other to significant changes in status. Programmed I/O transfers are used to transfer control, and status information between processors. The interprocessor interrupt facility is used to flag interprocessor requests, acknowledgements, and messages.

The system 10 may communicate with either local or remote host computer systems. The local central group interface 28 allows communications with the host, such as a NOVA data terminal multiplexer 30, over a serial, multidrop bus using asynchronous protocol. The remote communication interface 32 allows terminals 10 to be connected to a remote host system through a configuration of modems 34 and/or dial up or dedicated telephone lines.

The display controller 36 interfaces the TCPU 22 to the video CRT display 12. Command, status messages and display data are communicated via memory mapped I/O instructions. The display controller 36 supports character attributes such as inverse video, 2 level video, and blinking, etc. The internal refresh logic within display controller 36 is self supporting and does not utilize the system bus 30.

The diskette controller 38 interfaces the system bus 20 and communicates with the TCPU 22 via programmed I/O for commands and status exchanges while data transfers are performed via direct memory access (DMA) transfers. Diskette controller 38 may support several floppy 18 drives and is designed such that it is capable of supporting a variety of well known data formats.

In the particular embodiments shown in FIG. 1, the TCPU 22, ECPU 24 and diskette controller 38 each has the capability of taking control of the system bus 20 and, hence, are called "bus masters". Control of the bus 20 is generally used for direct memory access operations. Whether the particular bus master can gain control of the system bus is determined primarily by the state of the bus priority line which is coupled in a daisy chain fashion to each bus master. In this embodiment, diskette controller 38 has the highest priority ECPU 24 the next, and TCPU 22 the lowest priority. Thus, generally, the lower priority devices must relinquish control of the bus at the end of its current cycle if a higher priority device asserts a bus request.

The bus interface logic 40–48 of each of the modules, while particularly adapted to its associated module, has many characteristics in common. The most important characteristic is to provide an operation acknowledge signal over system bus 20 after a predetermined time delay associated with the time necessary for the particular slave module to complete the commanded operation. The TCPU 22 bus interface logic 40 further includes wait state and bus time out logic for determining whether the operation acknowledge signal had been received within a given time period.

The diskette controller 38, local central group interface 28, and remote communications interface 32 each include vectored interrupt capabilities as represented by the interrupt vector interface logic circuit blocks 54, 56, and 58, respectively. Similarly to the bus priority arbitration scheme, the interrupt priority arbitration scheme utilizes a serially connected daisy chain interrupt priority line to define the hierarchy. Once priority is established, the slave module places a multibit vector on the system bus 20 which is used to locate an instruction which is executed by the TCPU 22.

Particular aspects of the system 10 operation will be described in the following sections.

II. System Bus and Signal Definitions

The system bus 20 is the interface that allows each of the separate modules to communicate with each other. Bus 20 includes eighty lines of which twenty lines are address lines, sixteen lines are data lines, eighteen lines are control lines, three lines are interrupt lines, and the remainder being power lines or spares. A detailed line by line allocation of the lines in the system bus 20 are set forth in the following Table I.

TABLE I

| LINE | SIGNAL | LINE | SIGNAL |
|---|---|---|---|
| 1 | GROUND | 2 | GROUND |
| 3 | +5V | 4 | +5V |
| 5 | −5V | 6 | −12V |
| 7 | +12V | 8 | +12V |
| 9 | BATTERY (+12V NOMINAL) | 10 | SPARE [Reserved] |
| 11 | GROUND | 12 | SPARE [Reserved] |
| 13 | BD0 (H) | 14 | BD1 (H) |
| 15 | BD2 | 16 | BD3 |
| 17 | BD4 | 18 | BD5 |
| 19 | BD6 | 20 | BD7 |
| 21 | GROUND | 22 | BD9 |
| 23 | BD8 | 24 | BD11 |
| 25 | BD10 | 26 | BD13 |
| 27 | BD12 | 28 | BD15 (H) |
| 29 | BD14 | 30 | BA1 (H) |
| 31 | GROUND | 32 | BA3 |
| 33 | BA0 (H) | 34 | BA5 |
| 35 | BA2 | 36 | BA7 |
| 37 | BA4 | 38 | BA9 |
| 39 | BA6 | 40 | BA11 |
| 41 | GROUND | 42 | BA13 |
| 43 | BA8 | 44 | BA15 |
| 45 | BA10 | 46 | BA17 |
| 47 | BA12 | 48 | BA19 (H) |
| 49 | BA14 | 50 | BT-WD (L) |
| 51 | BA16 | 52 | GROUND |
| 53 | BA18 (H) | 54 | POWER OFF (L) |
| 55 | POWER ON (L) | 56 | DCOK (H) |
| 57 | ACOK (H) | 58 | INT-P (L) |
| 59 | NMI (L) | 60 | INTA (L) |
| 61 | GROUND | 62 | INT-V (L) |
| 63 | IPRIN (L) | 64 | IPRO (L) |
| 65 | IORC (L) | 66 | IOWC (L) |
| 67 | MRDC (L) | 68 | MWTC (L) |
| 69 | BUSY (L) | 70 | OPACK (L) |
| 71 | BPRO (L) | 72 | BPRIN (L) |
| 73 | GROUND | 74 | SPARE [Reserved] (Line Clock) |
| 75 | BCLK | 76 | M1 (L) |
| 77 | +5V | 78 | +5V |
| 79 | GROUND | 80 | GROUND |

The letters (H) and (L) in parenthesis next to the signal mnemonic indicates a high or low logical true condition.

The signal definitions or mnemonics used in the system bus 20 are defined as follows:

ADDRESS BUS (BA0-BA19)

Twenty bit, Tri-State High True address bus. The address bus provides for addressing of up to 1 M byte of memory and the low order eight bits provide for addressing of up to 256 I/O ports. Upper 4 bits used off board only, used to change pages of Bus Ram.

DATA BUS (BD0-BD15)

Sixteen bit, Tri-State, High True bidirectional data bus. All data transfers between the CPU, memory, and I/O devices occur over the data bus. Eight bit systems shall use only D0 thru D7.

MRDC(L)

Memory Read Command, Tri-State control line. Assertion of this signal indicates that a memory read operation is in process. The address bus specifies the target memory location and the contents of that memory location are copied to the data bus. When data is stable for reading by the requesting device the memory shall assert the OPACK signal.

MWTC(L)

Memory Write Command, Tri-State control line. Assertion of this signal indicates that a memory write operation is in process. The address bus specifies the target memory location. When the memory has completed the write operation it shall assert the OPACK signal.

IORC(L)

I/O Read Command, Tri-State control line. Assertion of this signal indicates that an I/O read operation is in process. The low order byte of the address bus specifies the target I/O port and the contents of that port are copied to the data bus. When data is stable for reading by the requesting device the I/O port shall assert the OPACK signal.

IOWC(L)

I/O Write Command, Tri-State control line. Assertion of this signal indicates that an I/O write operation is in process. The low order byte of the address bus specifies the target I/O port and the data bus specifies the data to be written into that I/O port. When the I/O port has completed the write operation it shall assert the OPACK signal.

BT-WD (L)

Byte-Word, Tri-State control line. Assertion of this control line, by the current bus master, signifies that a word operation (16 bit data) is currently in process. Deassertion of this control line, by the current bus master, signifies that a byte operation (8 bit data) is currently in process. This control line is essentially an address modifier and as such should follow the timing requirements for the address bus. In all cases the address bus shall specify the byte address of the memory location to be accessed. The least significant address bit (A0) shall specify the high or low order byte address to be accessed in byte mode. Word address shall be even, A0=0, and correspond to the high order byte of that word.

| A0 | BT-WD | Action |
|---|---|---|
| 0 | 0 | Access even 8 bit byte (D7–D0) (Hi-Byte) |
| 1 | 0 | Access odd 8 bit byte (D7–D0) (Lo-Byte) |
| X | 1 | Access 16 bit word (D15–D0) |

All byte accesses shall place the data on the data bus lines D7-D0. All word accesses place the odd byte on D7-D0 and the even byte on D15-D8.

This control line refers to memory access only and has no effect on I/O Access.

OPACK (L)

Operation Acknowledge, Open Collector control line. Assertion of this signal by an addressed memory or I/O port signifies completion of the associated read or write operation.

BPRIN, BPRO

Bus priority In/Out, Active Pullup, daisy chain Bus Request priority network. The highest priority device shall have its BPRIN line pulled low and its BPRO line daisy chained to the BPRIN line of the next lower priority device. A device may request the bus if, and only if BPRIN line is low. During a devices DMA cycles the device shall continue to monitor its BPRIN line such that if a higher priority device desires the bus the current device should relinquish the bus, the higher priority device shall recognize its selection by nonassertion of BUSY which signals its capability to now assert its BUSY line.

BUSY (L)
Bus Busy Signal, Open Collector, driven by the bus master currently in control to indicate that the bus is currently in use. BUSY prevents all other bus master modules from gaining control of the bus. BUSY is synchronized with BUSCLK.

M1 (L)
Machine Cycle One, Tri-State control line output from the TCPU. Assertion indicates the op code fetch cycle of an instruction execution. Signal is asserted twice for two byte op codes. Assertion of M1 concurrently with INTA indicates an interrupt acknowledge cycle and the interrupting device should place interrupt vector on the data bus.

IPRIN, IPRO
Interrupt Priority In/Out, Active Pullup, daisy chain interrupt priority network. The highest priority device shall have its IRPIN line pulled low and its IPRO line connected to the IPRIN line of the next lower priority device. Interrupt status is latched during assertion of M1 to allow daisy chain settling time. The interrupting device shall maintain its priority status until recognition of an I/O instruction to clear the interrupt flag.

INTA (L)
Interrupt Acknowledge, Tri-State control line output from the TCPU. This signal is used by a currently interrupting device to gate its interrupt vector to the data bus if and only if it has currently been granted priority via the IRPIN, IPRO daisy chain. Interrupt priority shall be latched by the leading edge of M1 prior to the assertion of INTA in order to allow the daisy chain to propagate and settle.

NMI (L)
Non Maskable Interrupt, Open Collector Control Line, CPU input and edge sensitive. Highest priority interrupt in system. NMI is acknowledged by a restart to location 0066 hex. BUSRQ is the only function overriding an NMI request in priority.

INT-V (L)
Vectored Interrupt Request, Open Collector Control Line, CPU input and level sensitive. Asserted by interrupting devices capable of supplying interrupt vectors during interrupt acknowledge cycle.

INT-P (L)
Polled Interrupt Request, Open Collector Control Line, CPU input and level sensitive. Asserted by interrupting devices not capable of supplying interrupt vectors. Interrupt acknowledge cycle is not asserted on the bus and the CPU firmware must poll all such devices to determine which device interrupted.

BCLK
Bus clock, Tri-State Clock signal generated by the TCPU and used by other bus master modules to synchronize their bus control signals.

PWR ON (L)
Power on control line from SAS devices. System power up command to the power supply.

Battery
The battery line shall be a +12 Volt unregulated line for use by devices requiring uninterrupted power. The battery charger shall be an integral part of the power control module.

AC OK (H)
AC Power OK, generated by power supply control logic and monitored by modules requiring knowledge of impending power failure, i.e. power fail interrupt.

DC OK
DC Power OK, generated by power supply control logic and monitored by modules requiring decoupling of devices to be backed up by battery power and all devices requiring initialization at power up time.

LINE CLOCK
Dedicated clock from TCPU. TTL compatible output to run real time low frequency requirements such as watchdog timers, polling time clocks, queue wait time checks, time of day clock, etc.

POWER OFF (L)
System power off command, generated by TCPU or other modules and monitored by power supply control logic. Assertion of this signal shall cause the power supply to shut down.

III. CPU Details, Bus Arbitration Logic, and Operation Acknowledge Generator

A. General

Figure 2A:
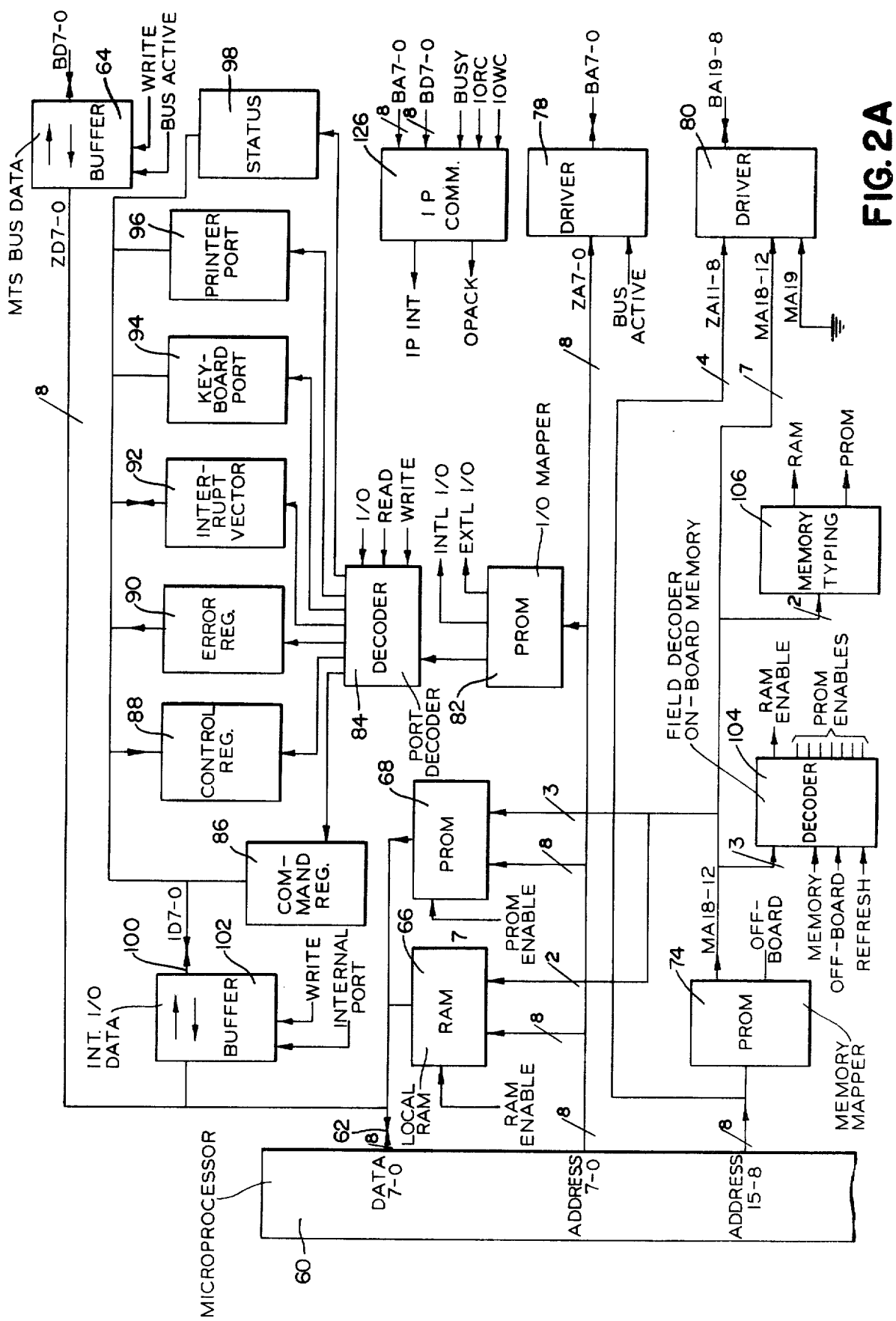
FIGS. 2(A-B) is a block diagram of the circuit components on a CPU board utilized in the system of FIG. 1.
Figure 2B:
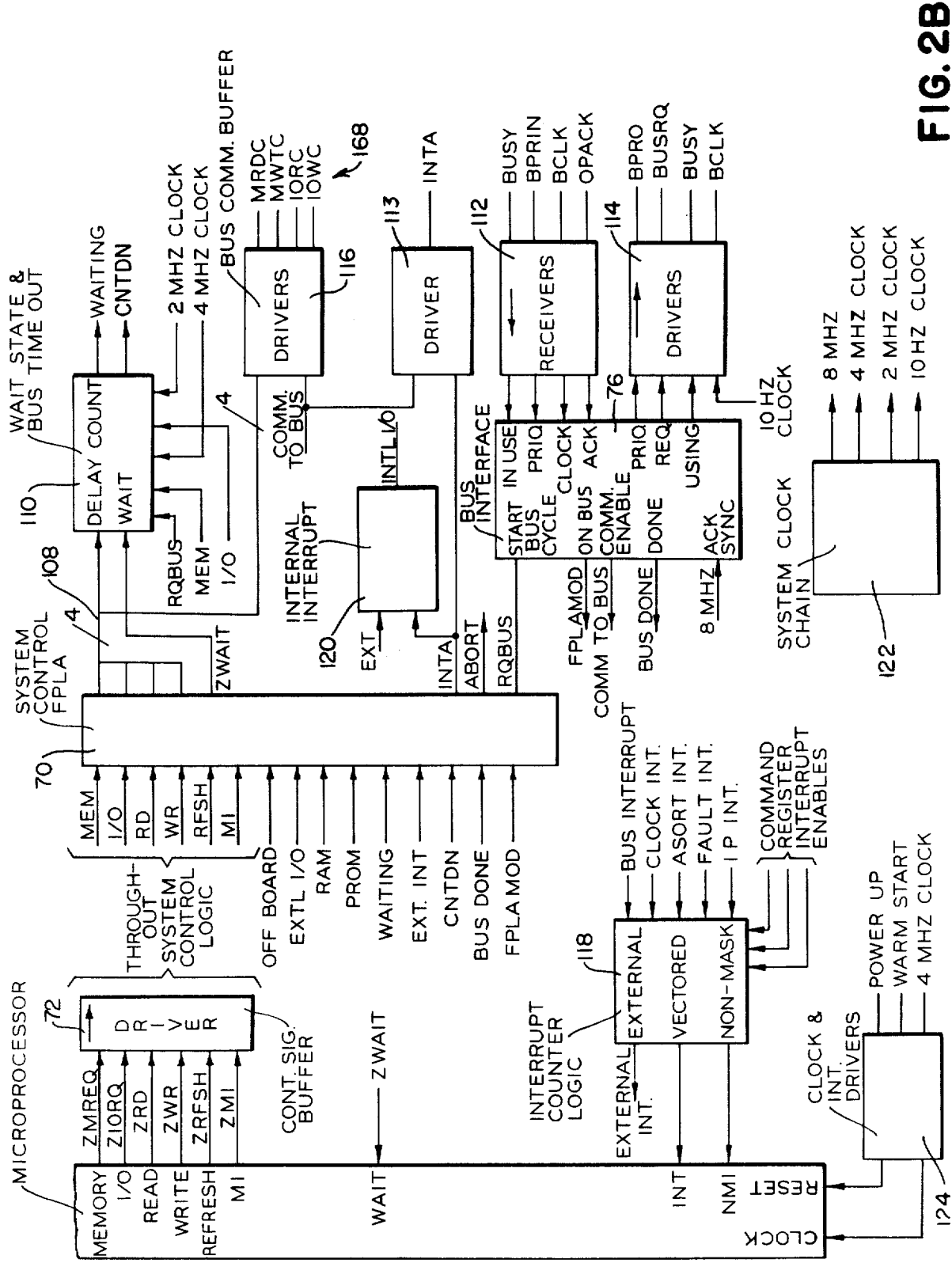

FIG. 2 is a block diagram of TCPU 22. The ECPU 24 is almost identical to TCPU 22 except as noted in section VI to be later described.

The main functional component is an eight bit microprocessor 60 having eight data lines, sixteen address lines, a plurality of control lines, and various clock and interrupt lines. In the preferred embodiment, microprocessor 60 is a commercially available Z-80A microprocessor manufactured by Mostek or Zilog. The internal operation of microprocessor 60 is thus well known in the art and will not be described in detail therein.

A bi-directional eight-bit data bus 62 communicates with the system bus 20 through buffer 64. In FIG. 2 the numeral adjacent the slash marks (/) indicates the number of separate bit lines. Data bus 62 is also coupled to onboard random access memory (RAM) 66 and programmable read only memory (PROM) which may be electrically alterable. In the particular embodiment, the CPU module may accept up to 2K bytes of 9114 RAM and up to eight 1K byte PROMS but only eight of the ten possible segments may be used at one time. There are seven 1K byte PROMS 68 and one 1K byte RAM 66 in the particular embodiment shown.

System 10 operations are primarily initiated by microprocessor 60 as it executes instructions from memory and response to interrupts, both from on board logic and from bus resident modules. A programmable logic array (FPLA) 70 serves as a system controller and received all significant status signals in the system, as well as microprocessor 60 control outputs through driver 72. FPLA 70, in turn, generates signals for sequencing the CPU module operation.

To support addressing of up to 1 megabyte of memory, system bus 20 includes twenty address lines as noted above. The present invention utilizes a memory management technique to convert from the 64K addressing limit of microprocessor 60 (due to its 16 bit address lines) to the 1 megabyte capability of bus 20. A memory mapping PROM 74 is used to translate the high order address lines of microprocessor 60 to the high order seven address bits of the bus 20 address lines. In addition, memory mapping PROM 74 contains a dedicated board select line which contains a bit to determine whether the address requested by microprocessor 60 is on the same board as the CPU, i.e. whether PROM 68 or RAM 66 is selected, or whether the address is off board and resides on the bus 20. This line is labled OFFBOARD. Upon detection of an off board memory request, microprocessor 60 is placed in a wait state by the system control FPLA 70 to allow the CPU access logic in bus interface 76 to gain access of bus 20. The low order microprocessor 60 address lines ZA7-0 are coupled to the system bus 20 through driver 78 while the ultimately developed high order address bits comprised of microprocessor address lines ZA11-8 and memory mapping PROM outputs MA18-12 are coupled to the system bus 20 through driver 80.

To support on boad I/O ports (hereinafter referred to as internal I/O devices) the CPU module utilizes an I/O mapping PROM 82 and I/O read-write decoders 84. I/O mapper PROM 82 accepts the low order address lines from microprocessor 60 as inputs and provides outputs to FPLA 70 (via EXTL I/O) and to the decoder 84 to specify: (1) internal I/O ports; (2) off board I/O ports; (3) group number of internal ports; and (4) port number of internal ports. The system control FPLA 70 accepts the internal/off board information to determine whether bus interface logic 76 is to be activated. The group number and port number output are accepted by decoder 84 which generates register strobes for the internal hardware I/O device registers. By utilizing a PROM for I/O mapper 82, any address or set of addresses may be assigned to the hardware registers on the CPU module without requiring actual hardware changes—aside from reprogramming of the PROM.

The hardware I/O registers installed on the CPU circuit board include command register 86, control register 88, error register 90, interrupt vector register 92, a parallel keyboard interface port 94, a parallel printer port 96 and a status register 98. Each of these registers communicate with the microprocessor data bus 62 over an internal bi-directional data bus 100 through buffer 102.

Memory mapper PROM 74 also includes these selected lines which are coupled to on board memory field decoder 104. When the control inputs to decoder 104 indicate an on board memory operation (e.g. OFF BOARD is false), the three input lines from memory mapper PROM 74 are decoded such that the appropriate RAM 66 or PROM 68 section is enabled. In an on board operation, two other lines from memory mapper PROM 74 provide a code illustrated by memory typing block 106 to indicate whether RAM 66 or PROM 68 has been selected. As is known in the art, the access times for commonly used RAMS and PROMS are somewhat different thereby necessitating a different CPU delay time. The RAM and PROM select outputs from memory typing block 106 are used as inputs to system control FPLA 70.

The four output lines 108 from FPLA 70 serve a dual purpose. In the early phase of an instruction, defined by the FPLA 70 input WAITING being false, the outputs 108 provide access time-delays for RAM 66 and PROM 68 or, alternatively, the bus time out delay in the case of off board operations. Depending upon the type of memory to be accessed, FPLA outputs 108 loads a predetermined count signal into wait state and bus time out logic 110. The microprocessor 60 is then placed into a waiting state until the loaded count time has elapsed as indicated by the signal CNTDN which is also coupled to an input of FPLA 70.

In the case of an off board memory operation indicated by the OFF BOARD signal from memory mapper PROM 74 to FPLA 70, FPLA 70 initiates a bus request RQBUS to the bus interface circuitry 76. As soon as it is appropriate for the CPU to obtain control of the bus 20, as determined by inputs to bus status receivers 112, bus interface logic 76 asserts a BUSY signal through bus control drivers 114 to indicate that it now has control of the bus. The busy signal from interface 76 is coupled back to an input FPLAMOD to FPLA 70 which changes its mode of operation such that output lines 108 now provide command signals to the system bus 20 through buffer 116. The off board slave module will generate an operation acknowledge signal OPACK after a predetermined time delay associated with the time necessary for that module to complete the particular commanded operation. The bus interface logic 76 will not generate a bus done signal BUS DONE until the operation acknowledge signal OPACK is received over the system bus 20. Consequently, if FPLA 70 detects a count done signal CNTDN from bus time out logic 110 before it receives a bus done signal BUS DONE from bus interface logic 76, an error condition is detected.

Interrupt control logic 118 initiates a standard interrupt INT or nonmaskable interrupt NMI depending upon the input conditions detected. Internal interrupt logic 120 determines the origin of the interrupt.

Clock and initialization drivers 124 provide the necessary clock reset signals to microprocessor 60.

Interprocessor communication logic 126 controls the method by which TCPU 22 and ECPU communicate with each other. The details of interprocessor communication logic 126 will be more fully discussed in connection with section V.

B. Details

To the extent possible, the same reference numerals utilized in the block diagram of FIG. 2 will be used in the detailed schematics of the following drawings to reference the same components. In the drawings, the bar over the mnemonic (e.g. $\overline{\text{OFFBOARD}}$) indicates that a zero logic level is representative of a true or asserted condition.

Figure 3A:
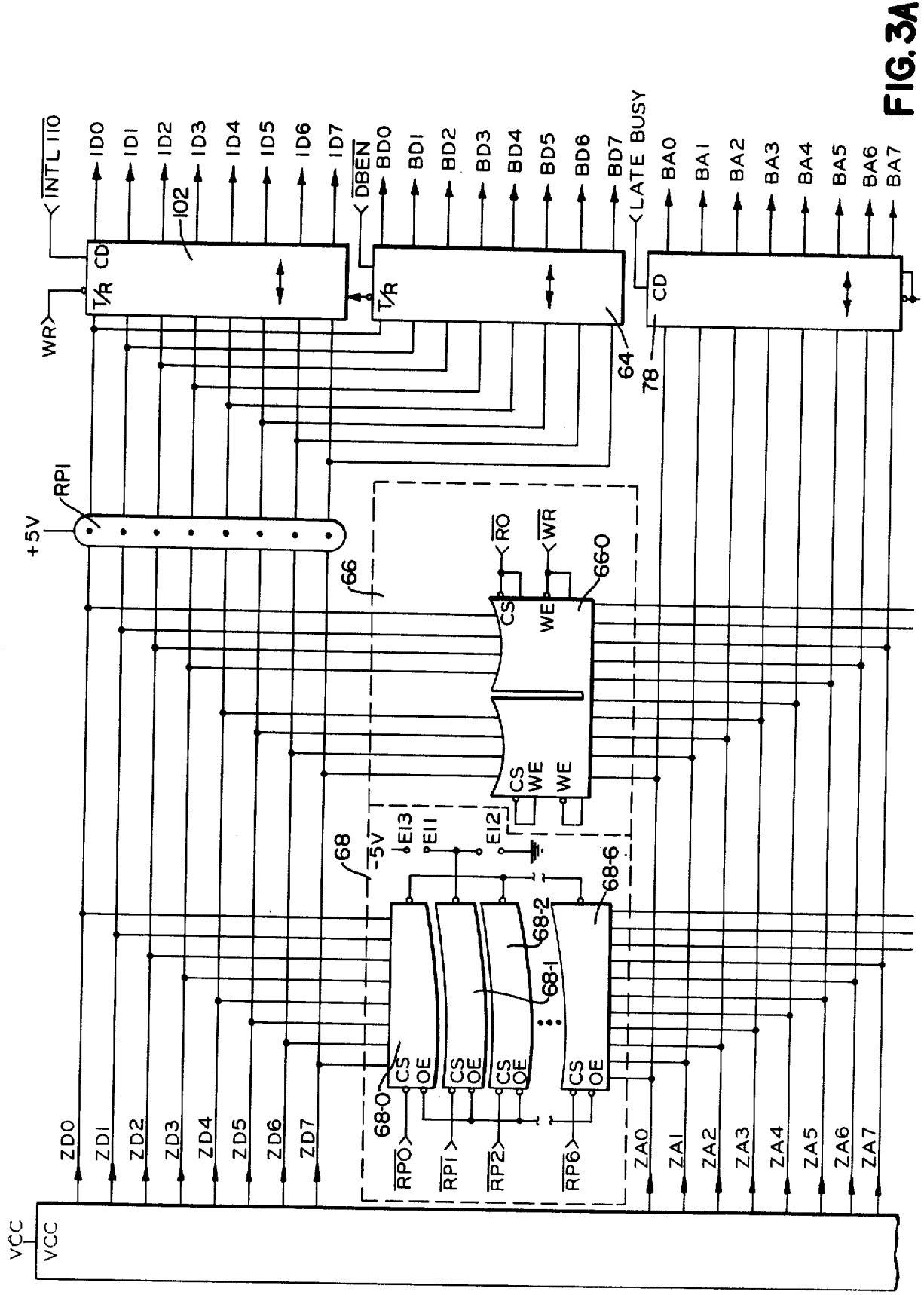
FIGS. 3(A-C) is a schematic diagram showing the details of the microprocessor and related circuitry used on the CPU board of FIG. 2.
Figure 3B:
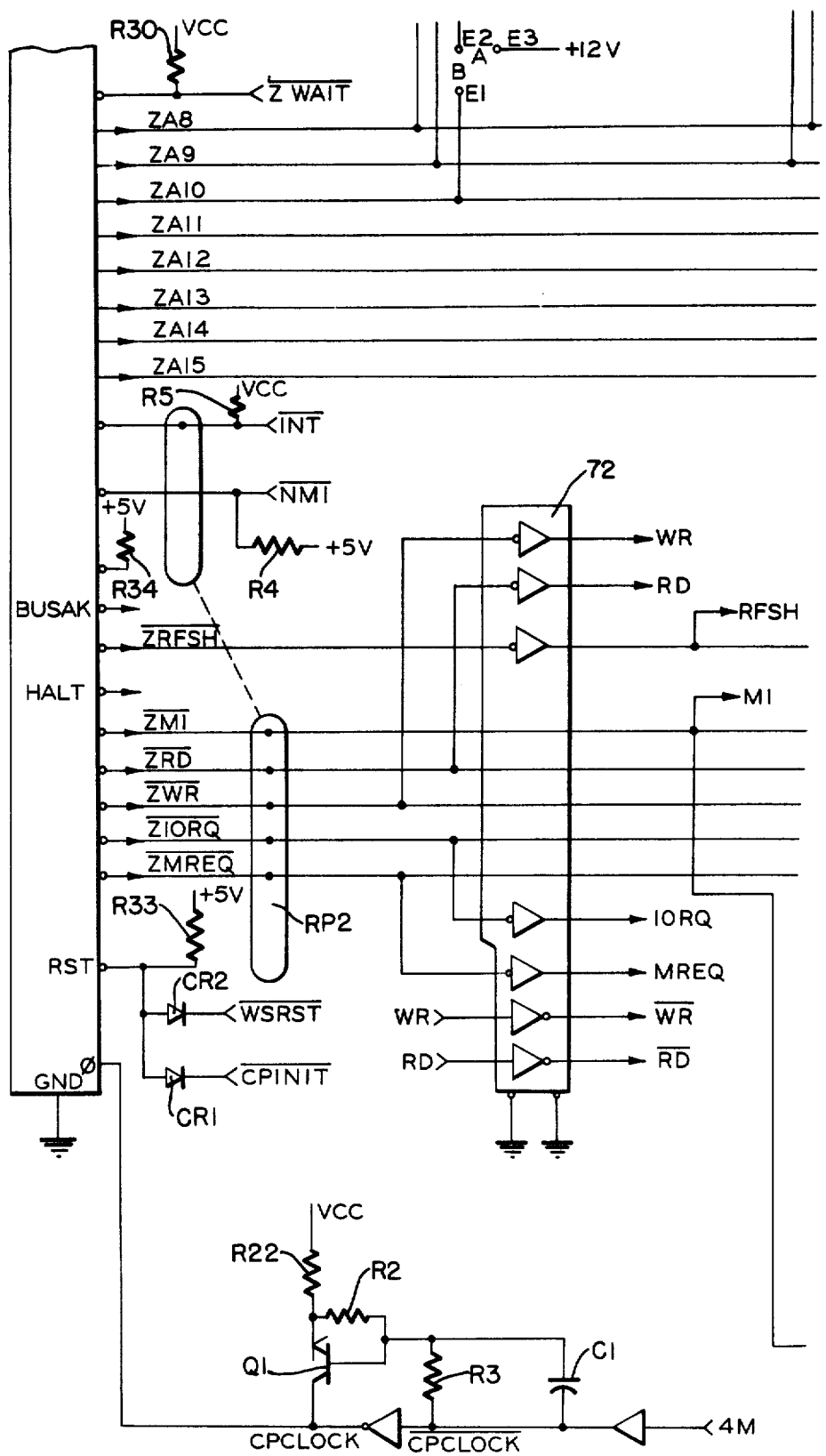
Figure 3C:
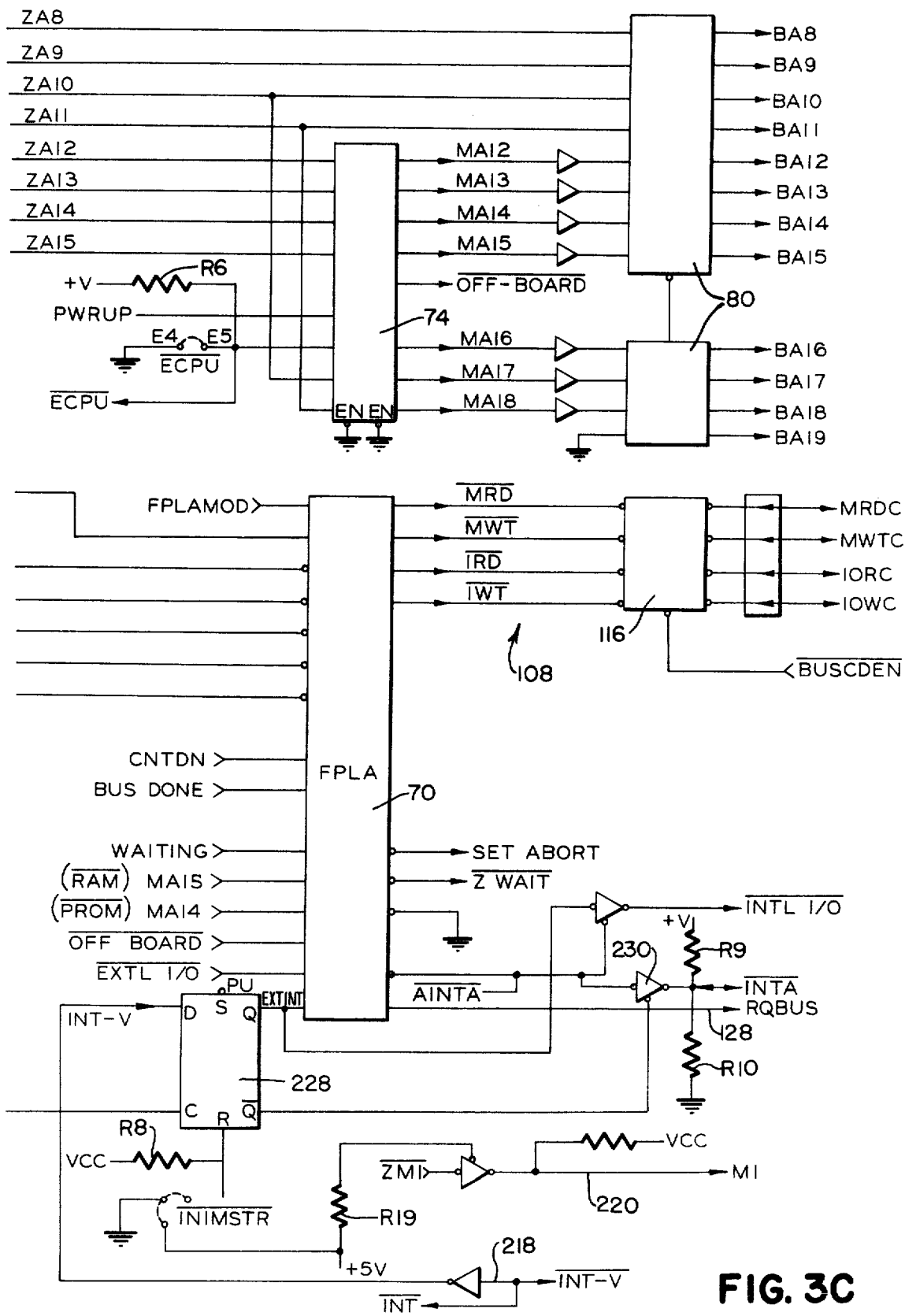

Turning to FIG. 3, PROM 68 consists of seven different segments 68-0 to 68-6, each segment consisting of a 1K×8 memory. Preferably, PROM segments are erasable programmable read only memories such as 2708 EPROM's. RAM 66 consists of 2 9114's making up a 1K×8 static memory 66-0.

The high order address lines ZA10-ZA15 are coupled to inputs of memory mapping PROM 74. Memory mapping PROM 74 is a 256×8 bit read only memory such as that manufactured by Texas Instruments as 74S471. Two additional status lines labled POWER UP and ECPU allow different mapping to be implemented for several different configurations; i.e. TCPU power up mode, TCPU system mode, ECPU power up mode, and ECPU system mode.

Figure 10:
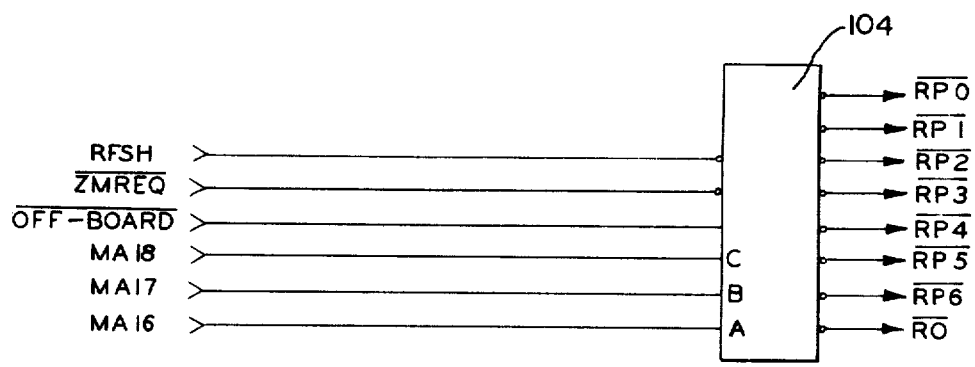
FIG. 10 is a schematic diagram of one embodiment of the on board memory field decoder.
Figure 11:
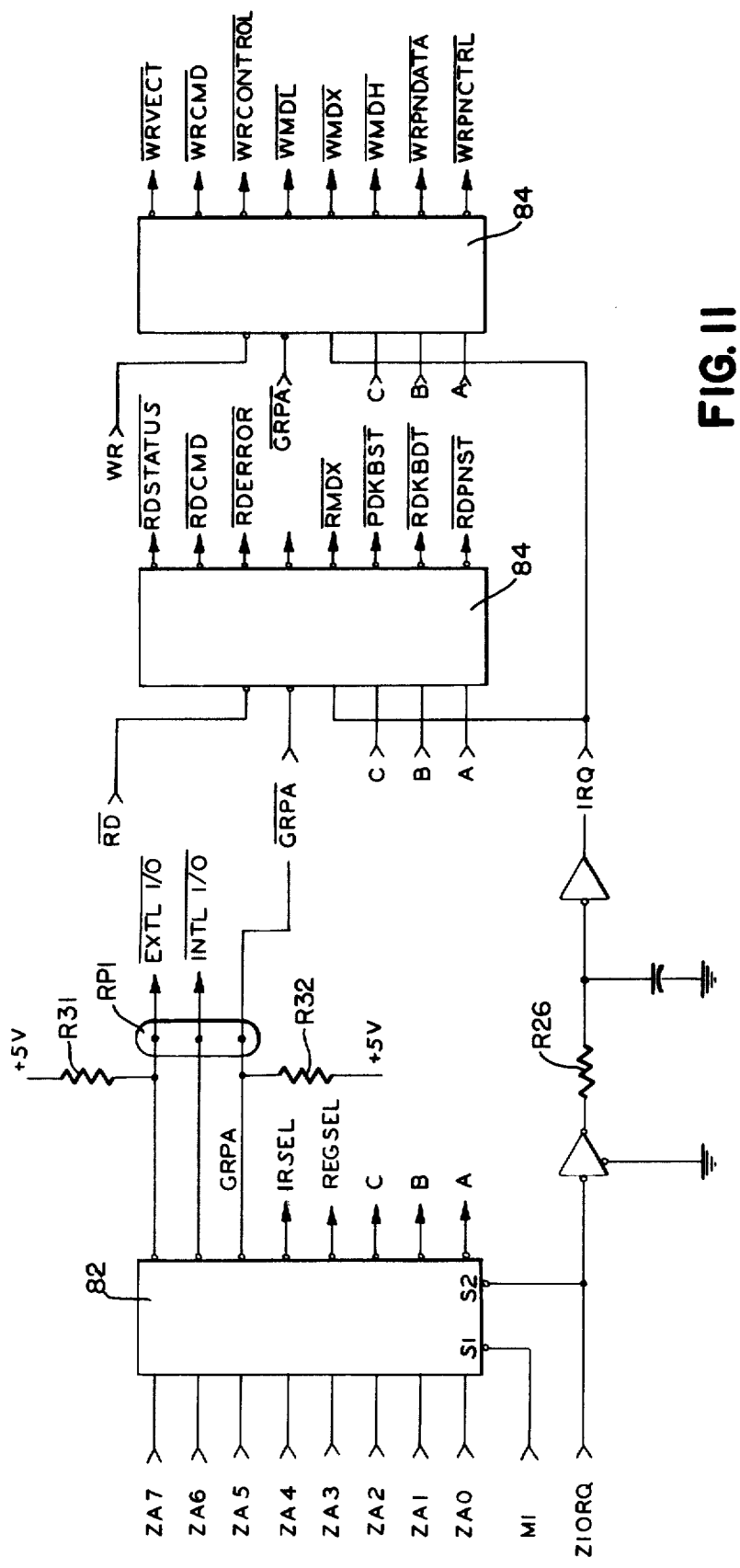
FIG. 11 is a schematic diagram of one embodiment of the I/O mapper and port decoder.

By virtue of the connection to six of the 16 address lines of the microprocessor 60, memory mapping PROM 74 may generate a unique set of outputs for each 1K segment of the 64K address range of the microprocessor 60. This 1K segmentation is used to allow mapping PROM 74 and associated field decoder logic 104 (FIG. 10) to select different PROMS (68-0 to 68-6) or RAM 68-0 for each of the 8 different memory segments which may be 1K or greater in size. Thus, by using the simple 1 of 8 decoder comprising field decoder logic 104 the on board memory is limited to 8 different devices, but these may be a combination of any of the following: component No. 2708 1K×8 EPROMS, 2716 2K×8 EPROMS, or 9114 1K×8 statis RAMS.

Whether an on board or off board memory segment is to be accessed is determined by a single bit from memory mapping PROM 74; i.e. the OFF BOARD output. In this embodiment, a logical low level indicates a true signal. When the OFF BOARD (L) line is false, i.e. logical 1, field decoder 104 is enabled and the memory segment selected on board is determined by memory mapping PROM output lines MA16, MA17, and MA18 which feed the select inputs of decoder 104. The memory mapping PROM 74 output byte for an on board operation is defined in the following Table II.

TABLE II

On-Board

| MA18 | MA17 | MA16 | MA15 | MA14 | MA13 | MA12 |
|------|------|------|------|------|------|------|
| SEL C | SEL B | SEL A | 1 | RAM | PROM | | |

Decoder select inputs: MA18, MA17, MA16
OFF BOARD: MA15

0 0  Non-existent
1 0  Prom
0 1  Ram
1 1  Not defined

Thus, field decoder 104, which is a 1 of 8 bit decoder, selectively enables one of the seven on board PROM devices (68-0 to 68-6) or RAM segment 66-0 depending upon the code provided by memory mapping output lines MA16 to MA18. Mapping PROM 74 output lines MA14 and MA15 provide signals to FPLA 70 so that it can load the appropriate count signal in wait state and bus time out logic 110 over lines 108 depending upon the access times necessary to complete RAM or PROM operations.

In the case where the OFF BOARD line from mapper PROM 74 is true, i.e. logical 0, the off board memory location is specified by the microprocessor 60 address lines ZA0 to ZA11 and by memory mapping output lines MA12 to MA18. In this condition, the output byte from memory mapping PROM 74 is defined by the following Table III.

TABLE III

Off-Board

| MA18 | MA17 | MA16 | 0 | MA15 | MA14 | MA13 | MA12 |
|------|------|------|---|------|------|------|------|

OFF BOARD

Note that for off board references, microprocessor 60 supplies 12 bits of address and memory mapping PROM 74 supplies 7 bits. This 19 bit address allows selection of up to 512K bytes of memory. In this embodiment, all twenty bus 20 address lines are not utilized since the CPU module does not control address line A19 but keeps it at a logical 1 at all times. If this address line was used by the CPU, it could address up to one megabyte of memory. Of course, since the limited 16 address lines of microprocessor 60 can specify only 1 of 65,536 unique addresses, the microprocessor cannot avail itself of 512K addresses at one time. However, multiple CPU modules such as TCPU 22 and ECPU 24 may be accessing different segments of memory, all of which reside on the system bus 20. In addition, those multiple CPU modules may be accessing some of those segments in common, as is done in the interprocessor communication network according to one aspect of this invention. It should be obvious to one skilled in the art that if a random access memory was utilized in place of a programmable read only memory for memory mapper 74 that microprocessor 60 could truly be capable of addressing one megabyte of memory despite its 16 bit line address limitations.

Figure 4:
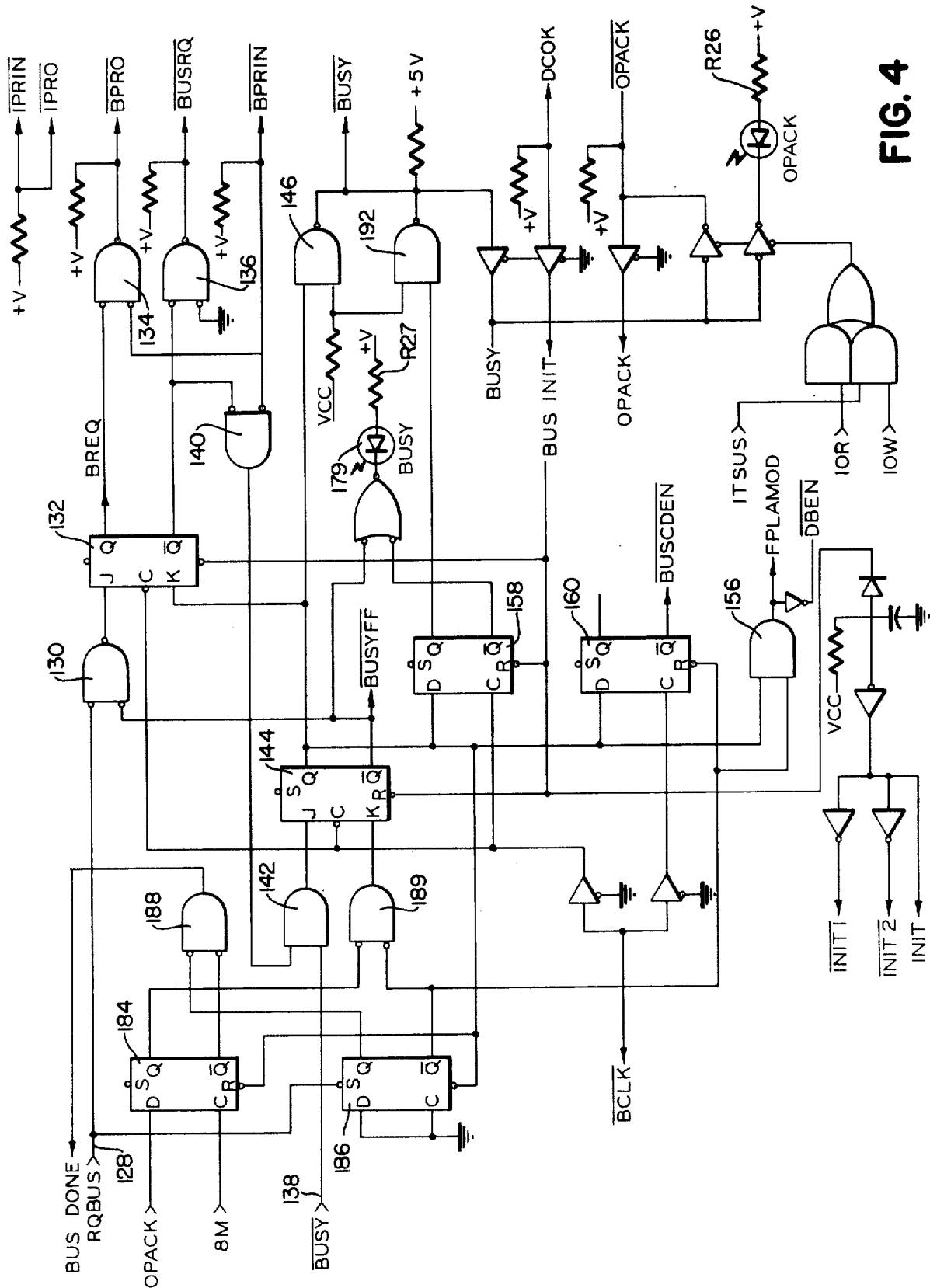
FIG. 4 is a schematic diagram of one embodiment of the bus interface logic circuitry.

Access to the resources on the system bus 20 from microprocessor 60 is controlled by the bus interface logic 76 which is shown in detail in FIG. 4. The signal to gain control of the bus RQBUS is generated by the system control FPLA 70 when the current address lines from microprocessor 60 indicate an off board memory or I/O location. As described above, this condition is detected by memory mapper 74 by a logical true OFF BOARD signal.

Figure 7:
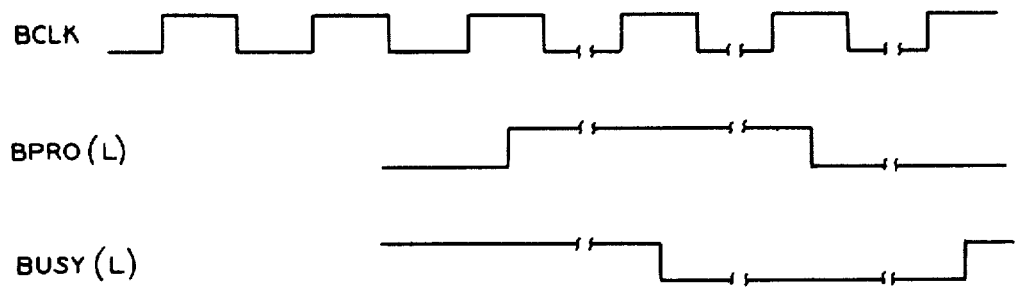
FIG. 7 is a timing diagram for a generalized bus timing sequence.

Upon assertion of RQBUS, the bus interface logic 76 sequences through the following steps. The RQBUS signal on line 128 from FPLA 70 is gated through gate 130 to flip flop 132. JK flip flop 132 changes state upon receipt of a clock synchronization signal from the bus clock signal BCLK. The high Q output of flip flop 132 is gated through gate 134 and causes the bus priority output line BPRO to go high thereby denying bus access to lower priority devices. The $\overline{Q}$ output of flip flop 132 is coupled through gate 136 to place a bus request BUSRQ signal on system bus 20. When bus 20 becomes inactive, the status of the BUSY signal on line 138 becomes false. If bus interface logic 76 were located in a slave module, as soon as the module previously using bus 20 is finished, it would deassert its bus priority line BPRO thus causing the bus priority line input BPRIN of the modules to go low indicating a true condition. However, since the TCPU 22 is the highest priority device, its bus priority input line is tied permanently to a logical zero level. The bus priority in BPRIN true condition is gated through gate 140 where it is ANDED with BUSY at gate 142. At the next bus clock signal BUSYFF flip flop 144 changes state causing its Q output to go high which is inverted by gate 146 to provide a true or logical low BUSY signal to the bus 20. The general timing diagrams for this stage of the process is shown in FIG. 7.

During times when TCPU 22 is not accessing bus 20, FPLA 70 (FIG. 3) is in one mode as determined by the input line FPLAMOD. In this mode, output lines MRD, MWT, IRD, and IWT provide a particular count signal to the wait and bus time out logic 110 which is shown in detail in FIG. 5.

The FPLA 70 accepts as inputs the signals which are set forth in the following Table IV:

TABLE IV

| Signal | Mnemonic | Origin |
|---|---|---|
| Memory req. | ZMREQ | microprocessor 60 |
| I/O req. | ZIORQ | microprocessor 60 |
| Read req. | ZRD | microprocessor 60 |
| Write req. | ZWR | microprocessor 60 |
| Refresh req. | ZRFSH | microprocessor 60 |
| M1 cycle | ZM1 | microprocessor 60 |
| Bus memory | OFF BOARD | memory mapper 74 |
| Ram select | RAM (MA15) | memory mapper 74 |
| Prom select | PROM (MA14) | memory mapper 74 |
| Bus I/O port | EXTLI/O | I/O mapper 82 |
| Wait State | WAITING | wait logic 110 |
| Count Done | CNTDN | wait logic 110 |
| Using Bus | FPLAMOD | bus interface 76 |
| Bus Done | BUSDONE | bus interface 76 |
| Bus interrupt | EXTINT | Bus 20 |

From the aforementioned inputs, FPLA 70 generates the outputs required to control sequencing of bus 20 accesses an counting out of on board access times or off board bus time delays. The outputs of FPLA 70 are listed in the following Table V.

TABLE V

| Signal | Mnemonic | Destination |
|---|---|---|
| Memory read | MRD | bus 20 |
| Delay count 8 | MRD | wait logic 110 |
| Memory write | MWT | bus 20 |
| Delay count 4 | MWT | wait logic 110 |
| I/O read | IRD | bus 20 |
| Delay count 2 | IRD | wait logic 110 |
| I/O write | IWT | bus 20 |
| Delay count 1 | IWT | wait logic 110 |
| Z80 wait | ZWAIT | microprocessor 60, wait logic 110 |
| Request bus | RQBUS | bus interface 76 |
| Interrupt ack | AINTA | bus 20 (INTA) or internal I/O bus 100 |
| Abort cycle | SET ABORT | error register 90 |

FPLA is multiplexed during the microprocessor 60 sequences to provide two different functions from the outputs MRD, MWT, IRD and IWT. In the early phase of an instruction, defined by input WAITING being false, these outputs provide access time delay for local RAM 66 or PROM 68 or the bus time delay for off board accesses-as determined by the input signals is asserted, the access is an internal I/O cycle, and no delay is required. In this case that neither EXTLI/O, EXTINT, nor OFF BOARD is being asserted, then FPLA 70 interrogates its RAM and PROM inputs to determine if one of those memories is being accessed. If either PROM or RAM is asserted, then the FPLA outputs in question provide a count appropriate to the access time of the particular memory being accessed. This count is loaded into counter 150. (See FIG. 5) After counter 150 is loaded, FPLA 70 places microprocessor 60 in a wait state indicated by a true signal on line ZWAIT which causes flip flop 152 to change state such that the counter 150 begins to count down from the particular count contained therein. Once counter 150 times out it provides a signal CNTDN to an input of FPLA 70. FPLA 70 then responds by taking microprocessor 60 out of the wait state.

Figure 8:
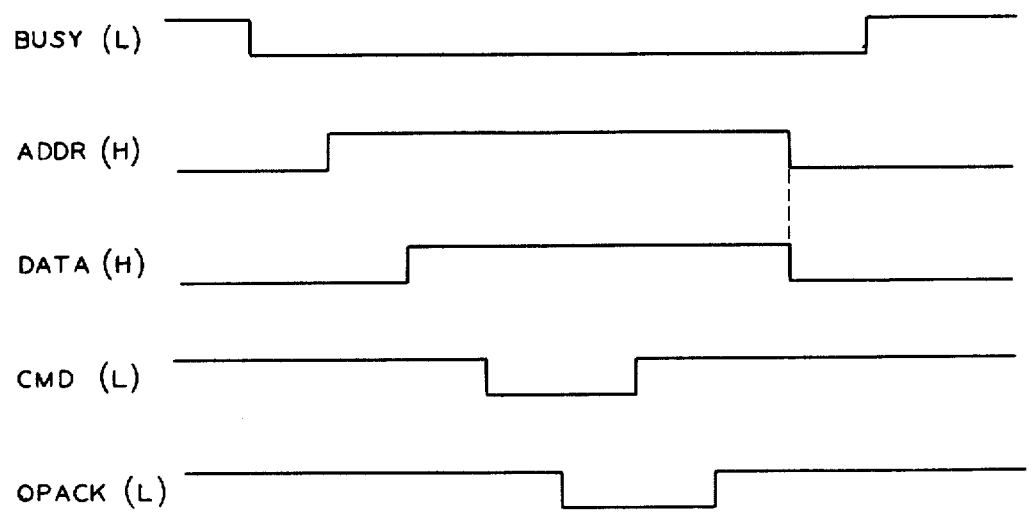
FIG. 8 is a timing diagram for a bus write cycle.
Figure 9:
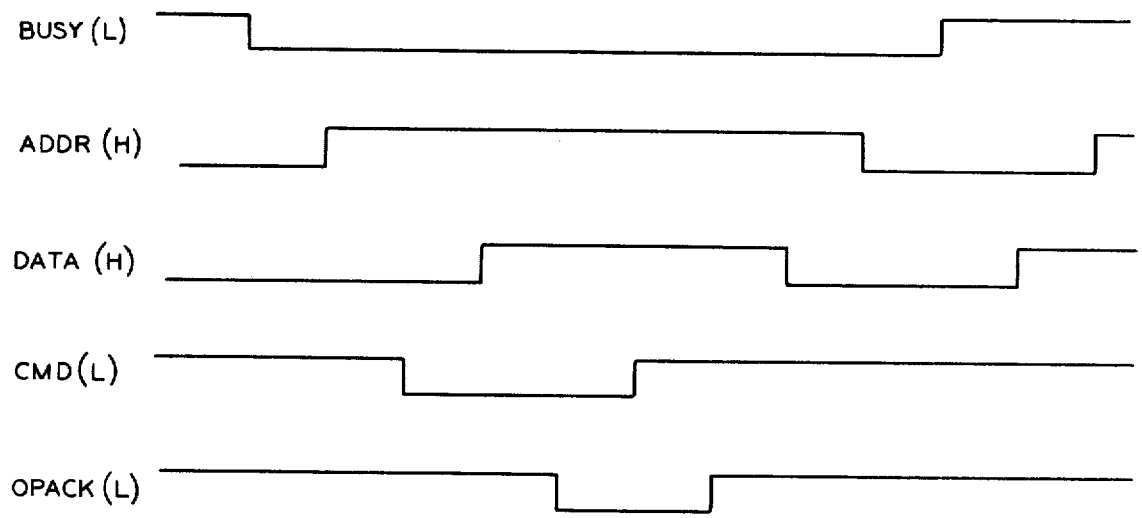
FIG. 9 is a timing diagram for a bus read cycle.

In the case of an off board operation as determined by the status of the OFF BOARD input to FPLA 70, multipurpose lines 108 provide the bus time out delay to counter 150. In this embodiment, the bus time out delay is about 8 microseconds and is chosen to be the maximum possible time for one of the slave modules to complete any particular operation. With reference also to FIG. 4, when the bus interface logic 76 has progressed to the point where it is asserting a BUSY signal over bus 20, the Q output of flip flop 144 causes gate 156 to change state. The output from gate 156 causes FPLA 70 to switch to its second mode indicated by line FPLAMOD. The Q output of flip flop 144 also controls the states of flip flops 158 and 160. The outputs LATE BUSY and BUSCDEN, as well as gate 156 output DBEN cooperate to enable address drivers 78 and 80, data driver 64, and command driver 116, respectively, to place address, data, and command signals onto bus 20 in the time sequence shown in FIG. 8 for a bus write cycle or FIG. 9 for a bus read cycle. Before this happens, however, the bus interface output line BUSRQ goes low due to the change in state of flip flop 132 whose K input is coupled to the Q output of flip flop 144.

Figure 5:
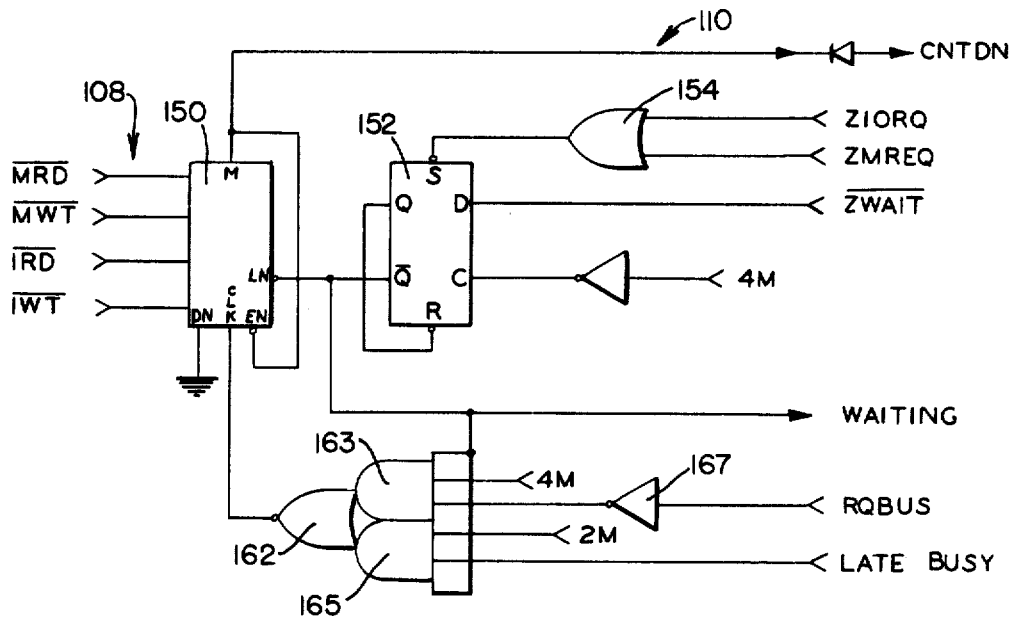
FIG. 5 is a schematic diagram of one embodiment of the wait state and bus time out logic circuitry.

Referring to FIG. 5, when the bus is accessed, counter 150 is enabled through gate 162 and thus starts counting down from the previously loaded bus time out delay count loaded by FPLA 70 in its previous mode. Gate 162 is an AND/OR invert gate in which OR gate 162 is enabled whenever AND gate 163 or AND gate 165 are enabled. During on board memory access, AND gate 163 is enables at a 4 megahertz clock rate as soon as the $\overline{Q}$ output (WAITING) of flip flop 152 goes high since the RQBUS input (inverted by inverter 167) will not be true because the bus 20 is not accessed during on board operations. The $\overline{Q}$ bar output of flip flop 152 is normally low when the microprocessor 60 is idling as indicated by low levels on lines Z10RQ and ZMREQ. Consequently, the counter 150 is loaded with count signals over lines 108 due to the low flip flop $\overline{Q}$ signal coupled to the load input LN of counter 150. When microprocessor 60 begins an I/O or memory operation Z10RQ or ZMREQ will go high thereby setting flip flop 152. Shortly thereafter, FPLA 70 will generate ZWAIT which is a low time condition. The flip flop 152 outputs will change state upon receipt of the next 4 M clock signal. At that time, the $\overline{Q}$ output of flip flop 152 will go high thereby locking the last count over lines 108 into counter 150. The high level on the WAITING line will enable gate 163 upon the next 4 M clock signal thereby enabling OR gate 162. Gate 162 is coupled to the clock input of counter 150 which controls counter 150 to begin its counting process. Counter 150 is a component No. 74LS191 in this example. When counter 150 counts down to zero it will provide a count done signal CNTDN back to FPLA 70.

In an off board operation the same basic sequence occurs in Wait State and Bus Time Out Logic 110 except that the counter 150 is loaded with the bus time out delay and the counter enabling gate 162 is enabled by the ANDing of the bus address enabling signal LATE BUSY and a 2 Megahertz clock signal, as well as the WAITING signal. Thus, counter 150 begins its counting process once the bus 20 has been accessed and will time out after the previously loaded bus time out delay has elapsed.

Figure 6:
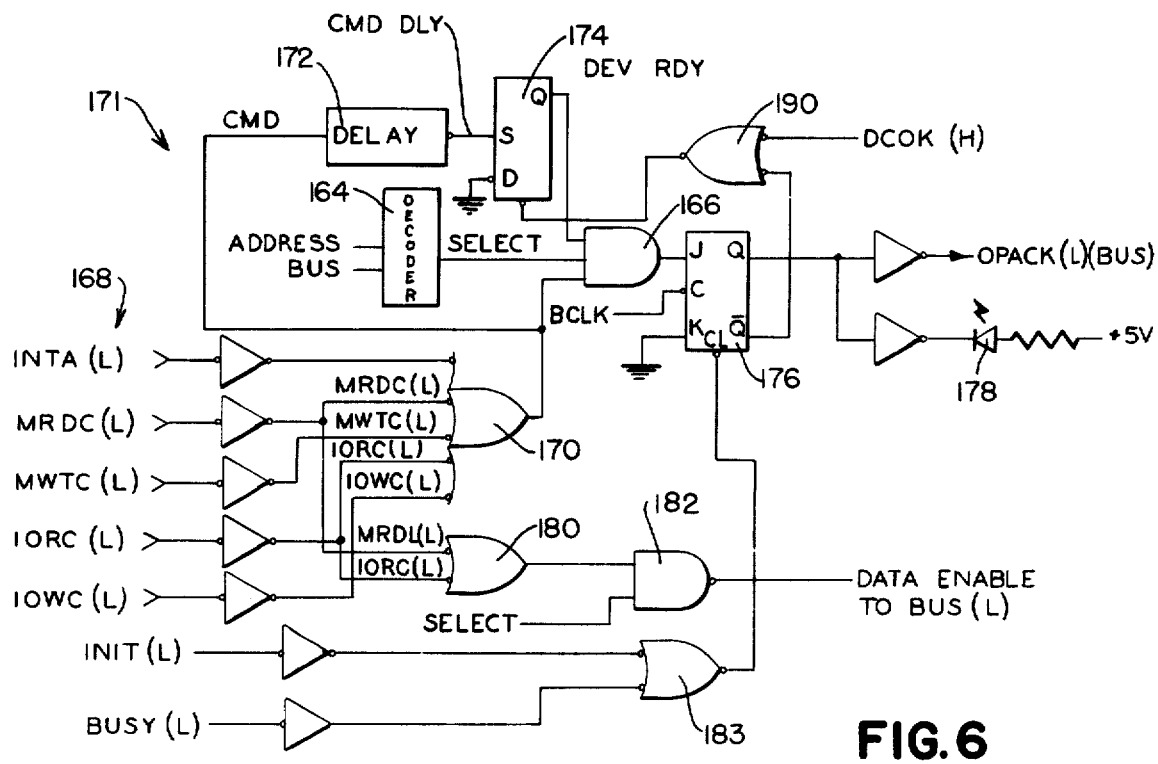
FIG. 6 is a schematic diagram of one embodiment of the operation acknowledge generating circuitry.

Under normal operating conditions, the addressed slave module will generate an operation acknowledge signal OPACK over system bus 20. FIG. 6 shows one embodiment of an operation acknowledge generating circuit 171 which may be used in the slave modules. The operation acknowledge generating circuit 171 includes a decoder 164 coupled to the address lines of bus 20. Upon decoding its address, decoder 164 provides a select signal to AND gate 166. Upon receipt of any of a plurality of bus commands generally indicated by reference numeral 168 over bus 20, gate 170 provides another input to gate 166. A command delay circuit 172 provides an output CMDDLY after a predetermined period of time associated with the time necessary for the slave module to complete the particular commanded operation. The details of the delay circuit 172 may vary from slave module to slave module but its implementation would be obvious to one skilled in the art. After delay circuit 172 times out, it sets flip flop 174 whose output is also coupled to AND gate 166. This causes AND gate 166 to provide an output to flip flop 176. The output of flip flop 176 then goes high on the next bus clock signal BCLK and provides the operation acknowledge OPACK signal over bus 20 back to the originating device, such as TCPU 22 in our example. LED 178 provides an indication of the status of the OPACK signal to aid the service technician in ascertaining the origin of system errors. Means such as gates 180 and 182 are provided to place data from the slave module on bus 20 during a memory read or I/O read operation.

Returning back to FIG. 4, the operation acknowledge signal from the slave module over bus 20 sets flip flop 184 in the bus interface logic 76. The Q output of flip flop 184 along with the Q output of flip flop 186 causes gate 188 to generate a BUS DONE signal. The BUS DONE signal is coupled back to system control FPLA 70. With reference again to FIG. 5, if everything proceeds according to normal operation, the BUS DONE signal will be received by FPLA before the count done signal CNTDN from wait state and bus time out logic 110 due to counter 150 timing out. If so, FPLA 70 removes the bus request signal RQBUS which causes flip flop 132 to change state and remove assertion of its bus priority line BPRO. The deasserted RQBUS signal also sets flip flop 132 to change state and remove assertion of its bus priority line BPRO. The deasserted RQBUS signal also sets flip flop 186. The $\overline{Q}$ output of flip flop 186 thus causes the deassertion of the command driver enabling signal BUSCDEN and data bus enable signal DBEN. The slave module then deasserts its OPACK signal since gate 166 (FIG. 6) no longer is in receipt of a command. The disabled gate 166 clears the flip flop 176 thereby deasserting its OPACK signal output.

Once the operation acknowledge signal is deasserted, flip flop 184 in the bus interface circuit 76 (FIG. 4) changes state such that gate 189 is enabled. This causes flip flop 144 to change state which, in turn, causes the address driver enabling signal LATE BUSY to be deasserted via flip flop 158. The relinquishing of the control over the bus 20 is accomplished by deasserting the BUSY signal via gate 192 coupled to the Q output of flip flop 158. It should be noted that the deassertion of the BUSY signal is the last bus line to be deasserted with respect to the bus priority line signal BPRO, address enable signal LATE BUSY, data enable signal DBEN, control enable signal BUSCDEN and operation acknowledge signal OPACK. A bus "hang" condition will occur during a bus cycle if a slave device asserts its operation acknowledge signal in response to a command but never deasserts it after the deassertion of a command. In such a case, the operation acknowledge LED 178 (FIG. 6) on the particular slave module and the BUSY LED 179 (FIG. 4) of the CPU will remain lighted thereby telling the service technician that a "bus hang" condition exists and that this particular slave module and processor caused the problem.

It is important to realize that once the FPLA 70 deasserts the bus request line RQBUS that the microprocessor 60 is no longer involved in the bus access operation. Since the microprocessor 60 is disconnected from bus 20 early, it is possible for it to request another cycle prior to finishing the bus access cycle of the bus interface logic 76. Flip flop 186 thus serves as a "new cycle/old cycle" latch to differentiate between the phases of the access to allow old operations to complete prior to initiation of new operations. However, from the viewpoint of the microprocessor 60 and system control FPLA 70, operation of the bus access is defined by the return of the BUS DONE signal in response to the request bus signal RQBUS.

Figure 12A:
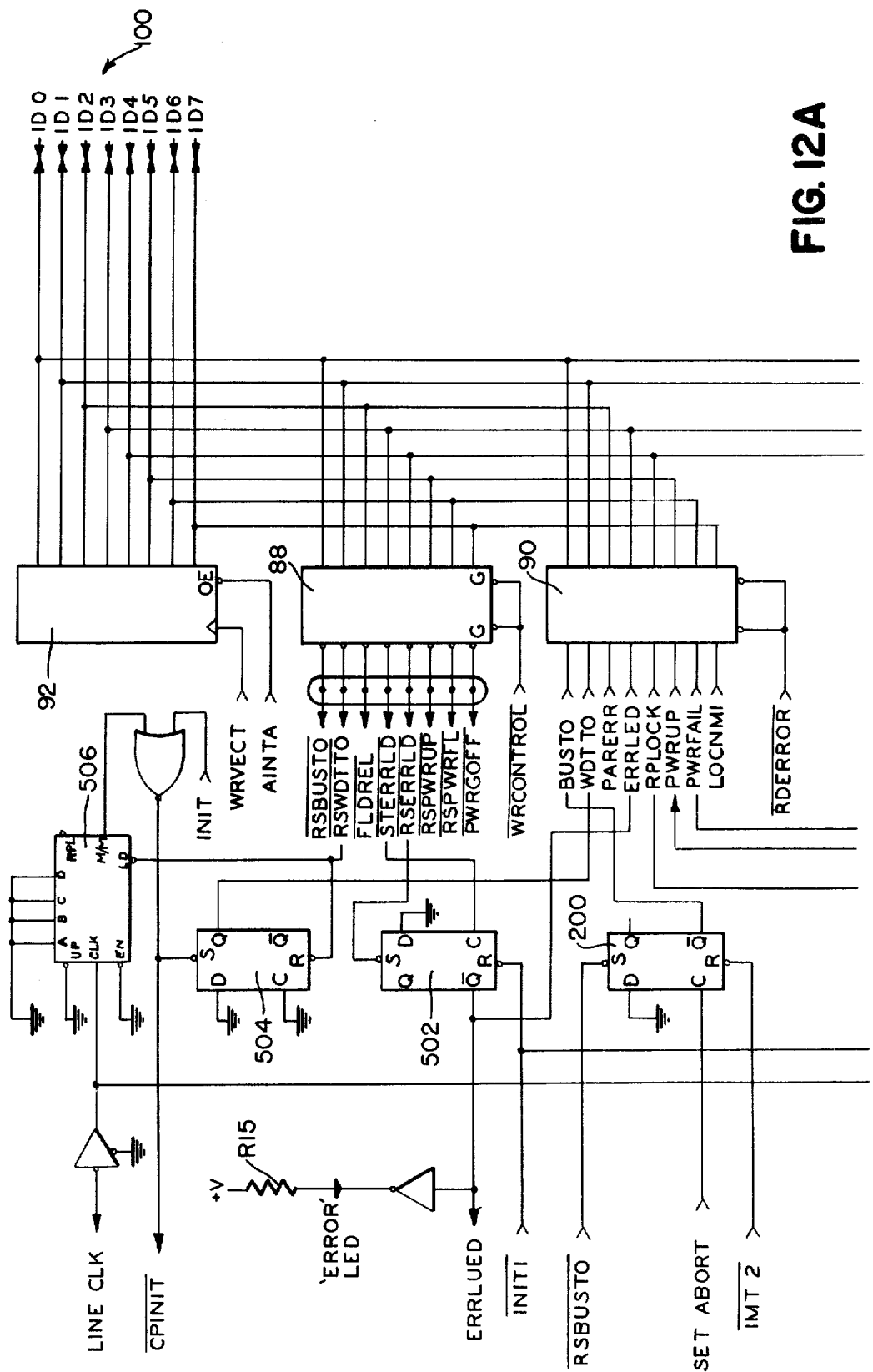
FIGS. 12(A–C) is a schematic diagram of one embodiment of the internal I/O data registers on the CPU board.

In the event that the count done signal CNTDN from wait state and bus time out logic 110 occurs before the BUS DONE signal from bus interface logic 76, FPLA 70 generates a SET ABORT signal on one of its outputs. Referring to FIG. 12, the SET ABORT signal toggles flip flop 200. The $\overline{Q}$ output of flip flop 200 thus enters a bus time out status bit BUSTO into error register 90. As can be seen in the lower portion of FIG. 12(C), the bus time out status bit BUSTO causes a nonmaskable interrupt NMI to microprocessor 60. In response to a nonmaskable interrupt microprocessor 60 branches immediately to an interrupt service routine which causes microprocessor 60 to read the status error register 90. The detection of the bus time out NMI, or any NMI, causes the microprocessor to put the current content of the TCPU 22 program counter onto a stack, for example, in RAM 66. Thus, the system records the operation which was attempted to be performed before the error condition was detected, thereby permitting a wide variety of user programmed interrupt service routines to correct or log the error.

IV. VECTORED INTERRUPT SYSTEM

Figure 13:
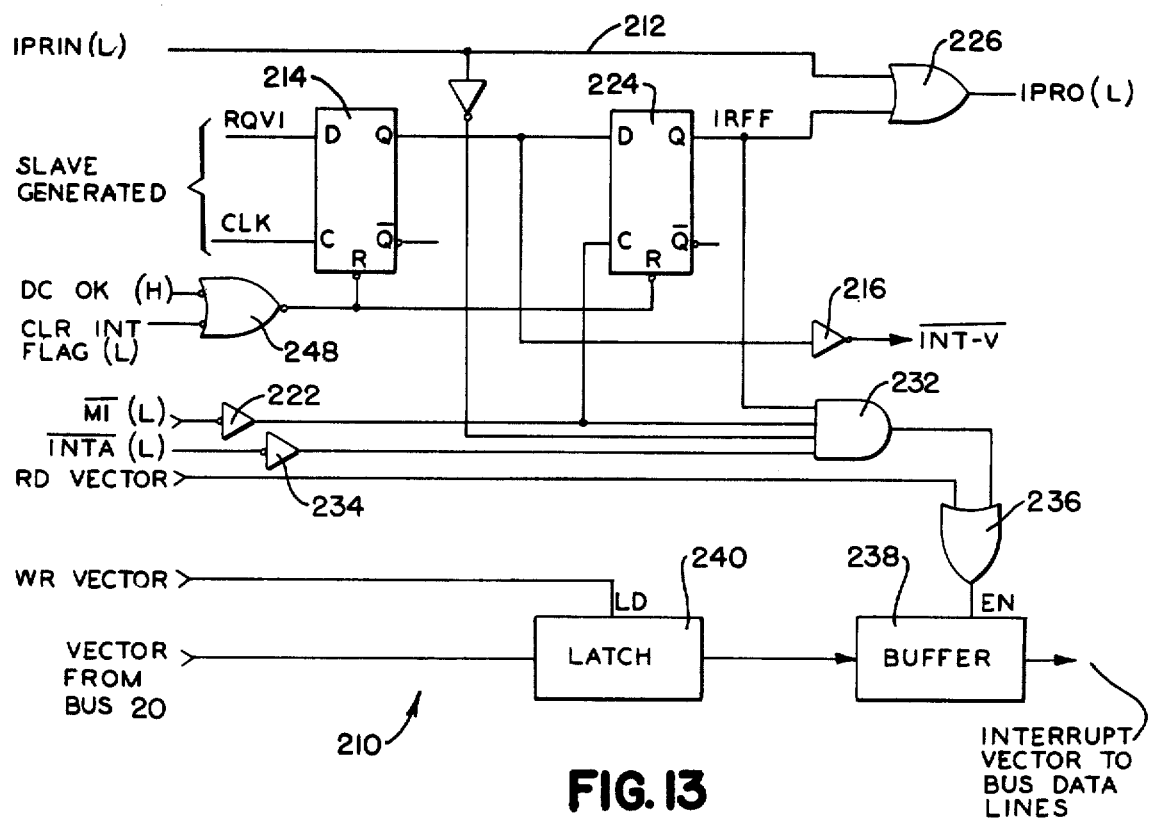
FIG. 13 is a schematic diagram of one embodiment of the vectored interrupt interface logic.
Figure 14:
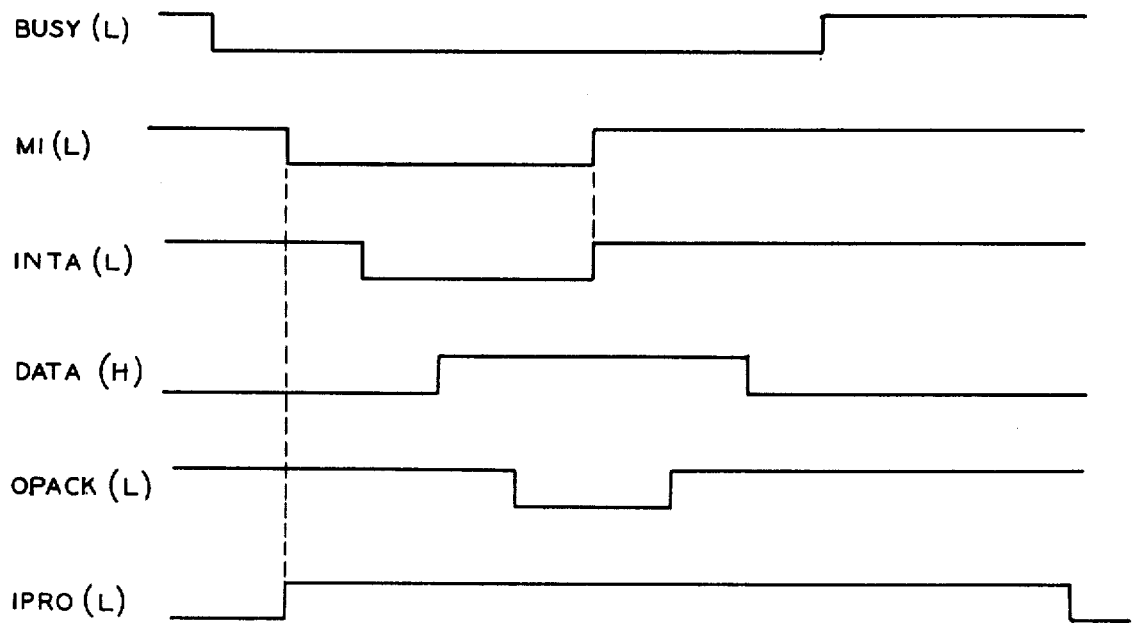
FIG. 14 is a timing diagram of the vectored interrupt cycle.

Some of the slave modules, in particular, diskette controller 38, local central group interface 28 and remote communication interface 32 have vectored interrupt capabilities. FIG. 13 shows one embodiment of the vectored interrupt logic circuitry contained on these modules. FIG. 14 shows a timing diagram for the bus interrupt acknowledge cycle carried out in accordance with the teachings of this invention.

With specific reference to FIG. 13, vectored interrupt logic 210 includes an interrupt priority line 212 which is coupled in a daisy chain fashion to the other modules having vectored interrupt capabilities. Thus, the input IPRIN is coupled to the output of the preceding module and the output IPRO is coupled to the input of the next module lower in priority. Note that a logical zero level is a true condition which means that if priority line 212 is at a logical zero level no other slave module is currently in the process of a vectored interrupt and that it is all right for the particular slave module to perform a vectored interrupt cycle upon recognition of an INIA command.

The bus interrupt cycle is begun by the slave module generating a signal RQVI to request a vectored interrupt. The RQVI signal is coupled to the D input of flip flop 214 which serves as an asynchronous interrupt condition storage device. After being clocked by an appropriate clock signal on the C input of flip flop 214, the high Q output is coupled to bus 20 through inverter 216 to generate a vectored interrupt request INT-V. Referring back to FIG. 3, the interrupt vector request INT-V is received over bus 20 on line 218 and causes an interrupt INT of microprocessor 60.

The interrupt vector request signal INT-V sets the flip flop 228 which is coupled to FPLA 70. The $\bar{Q}$ output of flip flop 228 is coupled through driver 230 whose output generates an interrupt signal INTA over bus 20 back to the vectored interrupt circuitry 210 over bus 20. The interrupt acknowledge signal INTA is generated by TCPU 22 a predetermined time after the generation of machine clock signal M1.

Referring again to FIG. 13, the leading edge of machine clock signal M1 after being inverted by inverter 222 serves to clock the interrupt flip flop 224. Since the D input of flip flop 224 is coupled to the Q output of flip flop 214 which is in a high level due to its previous setting when the interrupt request was initially generated, the Q output of interrupt flip flop 224 will now go high. The high level on line IRFF enables priority gate 226 to provide a logical 1 or high output on line IPRO. If the slave module generating the request is the highest priority device, all other slave modules in the chain will thus have their interrupt priority lines 212 at a logical 1 level thereby indicating that a higher priority device has asserted an interrupt request. By clocking flip flop 224 on machine clock signal M1, the daisy chain priority circuitry is allowed to stablize.

Enabling gate 232 includes a plurality of inputs which are ANDed together. One input is the signal IRFF from priority flip flop 224, another input is the signal MY PRIORITY which is an inversion of the signal level on priority line 212, another input is an inverted version of signal M1, and the other input is the interrupt acknowledge signal INTA which is inverted by inverter 234. The output of AND gate 232 is coupled through OR gate 236 to an enabling input of buffer 238. Buffer 238, when enabled, will couple the contents of latch 240 onto bus 20. Latch 240 contains a multibit data word vector which has been previously loaded into it during system initialization. The data vector in latch 240 preferably contains information which is read by TCPU and causes it to execute an instruction associated with the vector from the interrupting module. In other words, the vector placed on the data bus 20 during a vectored interrupt cycle will cause TCPU 22 to jump to a particular instruction located at a predetermined memory location associated with that vector, with TCPU 22 then progressing through the interrupt service routine beginning with that instruction for servicing the interrupting device.

It is important to note that the vectored interrupt priority scheme of this invention will enable buffer 238 only when all of the inputs to enabling AND gate 232 indicate all of the following conditions are met: (1) that the interrupt flip flop 224 has been set; (2) that the state of bus priority line 212 indicates that a higher priority device is not requesting an interrupt; (3) a bus interrupt acknowledge signal INTA has been received; and (4) a bus machine clock signal M1 has been received. The first three conditions are important but the last one merely aids to increasing system operational security. Accordingly, once the interrupt acknowledge signal INTA is received over bus 20 by the slave modules, only the slave module which has interrupt flip flop 224 previously set will dump its interrupt vector from latch 240 onto bus 20 and thereby interrupt the microprocessor 60 of TCPU 22. It is important to understand that once a particular slave module has initiated a vectored interrupt request and the cycle has proceeded to the state where flip flop 224 is set, it is not possible for even higher priority devices to have all of the aforementioned conditions met by the time that the subsequently received interrupt acknowledge signal INTA is generated.

The following Table VI shows a Truth Table illustrating the various states on the vectored interrupt priority line 212 in relationship to the state of flip flop 224:

TABLE VI

| IPRIN | IRFF | IPRO |
|-------|------|------|
| 0 | 0 | 0 |
| 1 | 0 | 1 |
| 0 | 1 | 1 |
| 1 | 1 | 1 |

The interrupted microprocessor here TCPU 22, reads the data vector after noting the operation acknowledge signal OPACK which is generated by the bus interface logic on the interrupting slave device. The cycle is completed by the interrupting device deasserting OPACK and the controlling processor deasserting its M1 line, INTA line, and after an appropriate delay deasserting the BUSY signal generated by its own bus interface logic as noted above. Preferably, the controlling processor, in its interrupt service routine, generates an I/O write cycle which provides a signal CLR INT FLG to reinitialize the slave module vectored interrupt circuitry 210. In the embodiment shown in FIG. 13 this is accomplished by coupling the clear interrupt flag CLR INT FLG through gate 248 to the reset inputs of flip flops 214 and 224.

Provision may also be made for reading the vector in latch 240 by independently enabling buffer 238 by the provision of a read vector signal RD VECTOR which is coupled to OR gate 236.

V. INTERPROCESSOR COMMUNICATION

Figure 15:
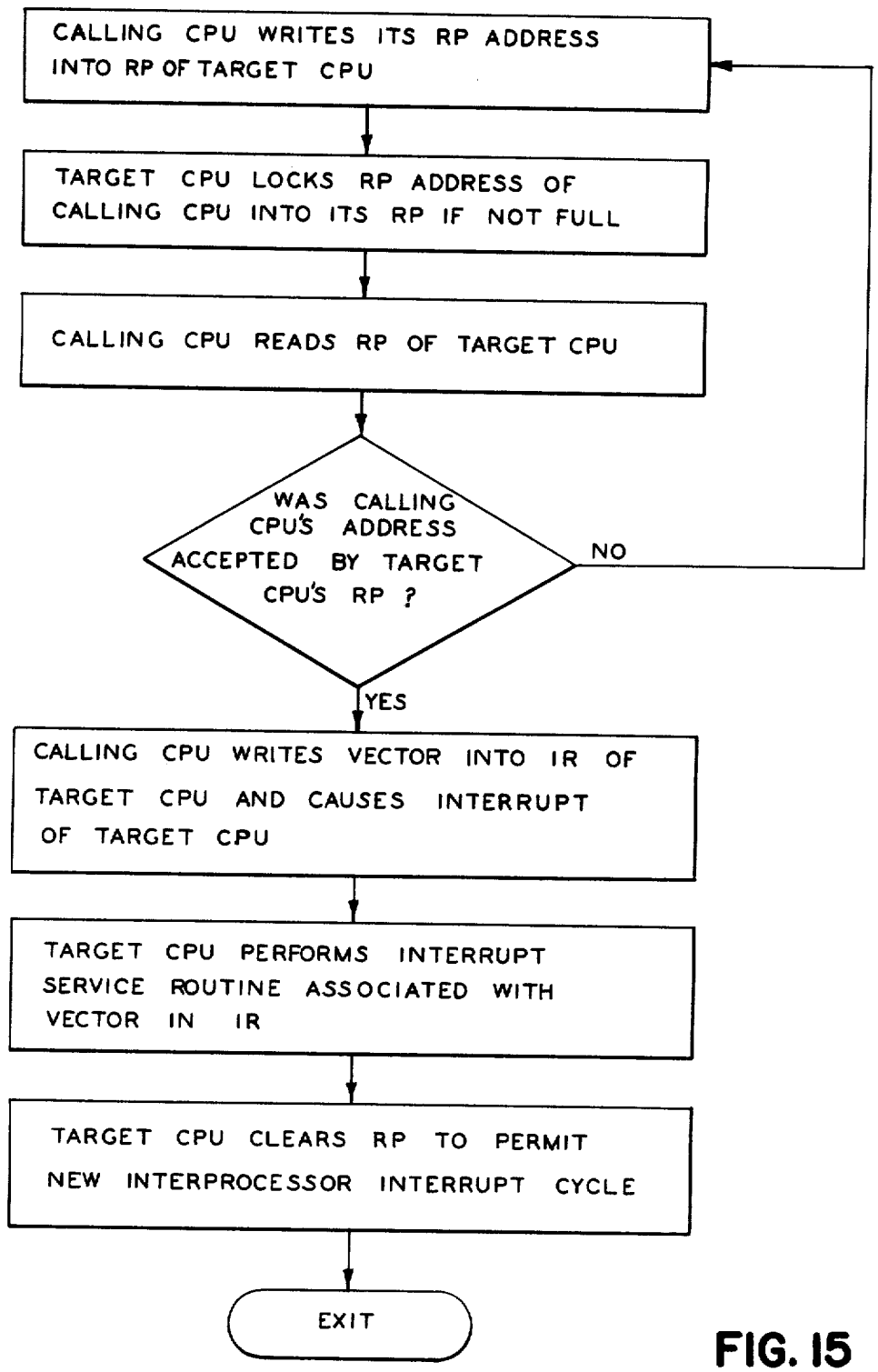
FIG. 15 is a flow chart illustrating the sequence of steps carried out during interprocessor communication.

The interprocessor communication scheme according to a further feature of this invention is best described in connection with a specific example. In this example, it is assumed that TCPU 22 is attempting to communicate with ECPU 24 (FIG. 1). FIG. 15 is a flow chart showing a sequence of steps which are carried out in interprocessor communication.

Figure 12B:
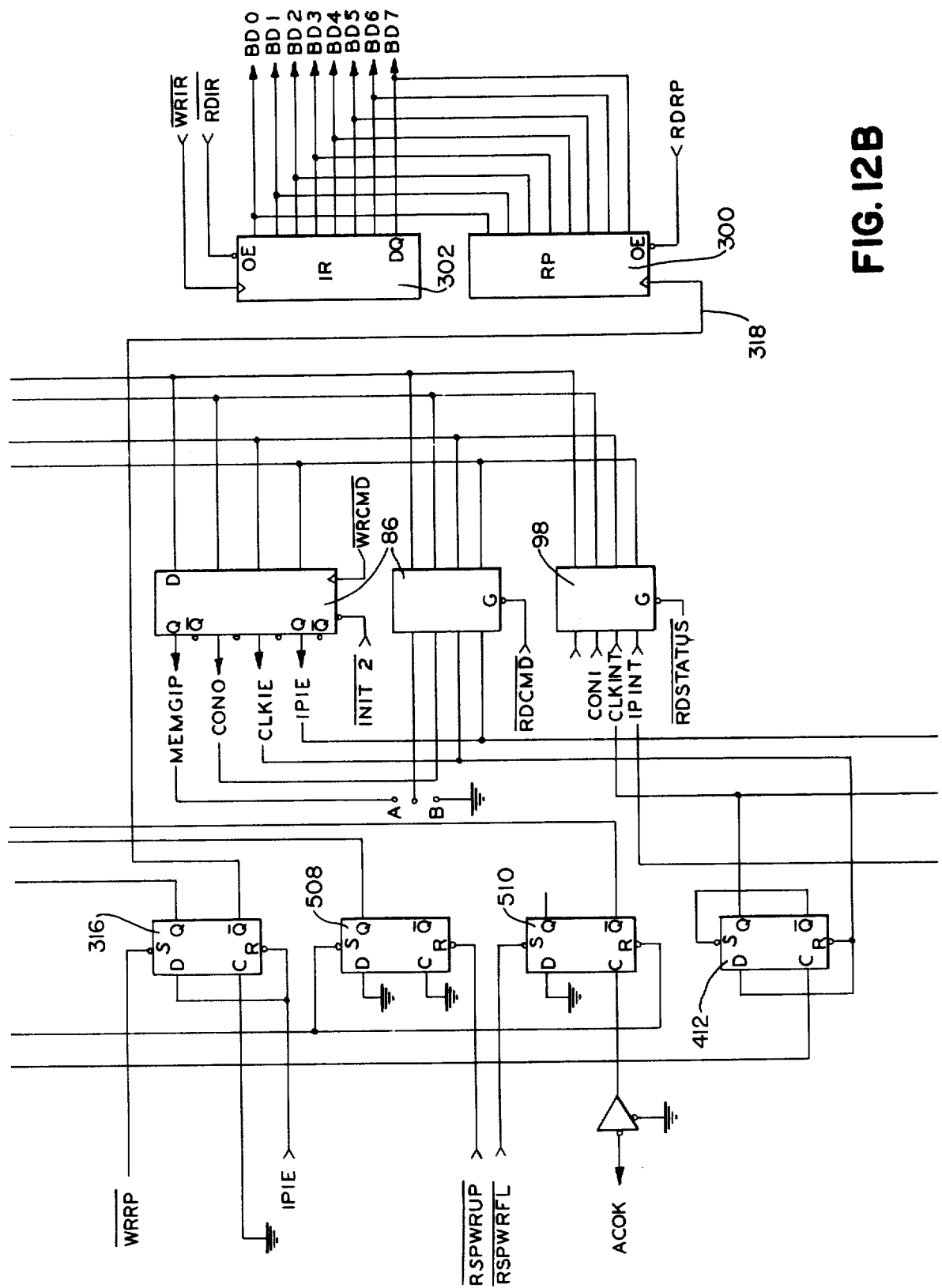

The first step is for the calling processor (here, TCPU 22) to write its own response port address into the response port of the target processor (here, ECPU). Each processor includes two bus addressable I/O registers 300 and 302 which serve as a response port and an interrupt register, respectively as shown in FIG. 12(B). It should be noted that all of the schematic diagrams in FIGS. 2–12 as well as FIG. 16 to be described, are common to both TCPU 22 and ECPU 24.

Figure 16:
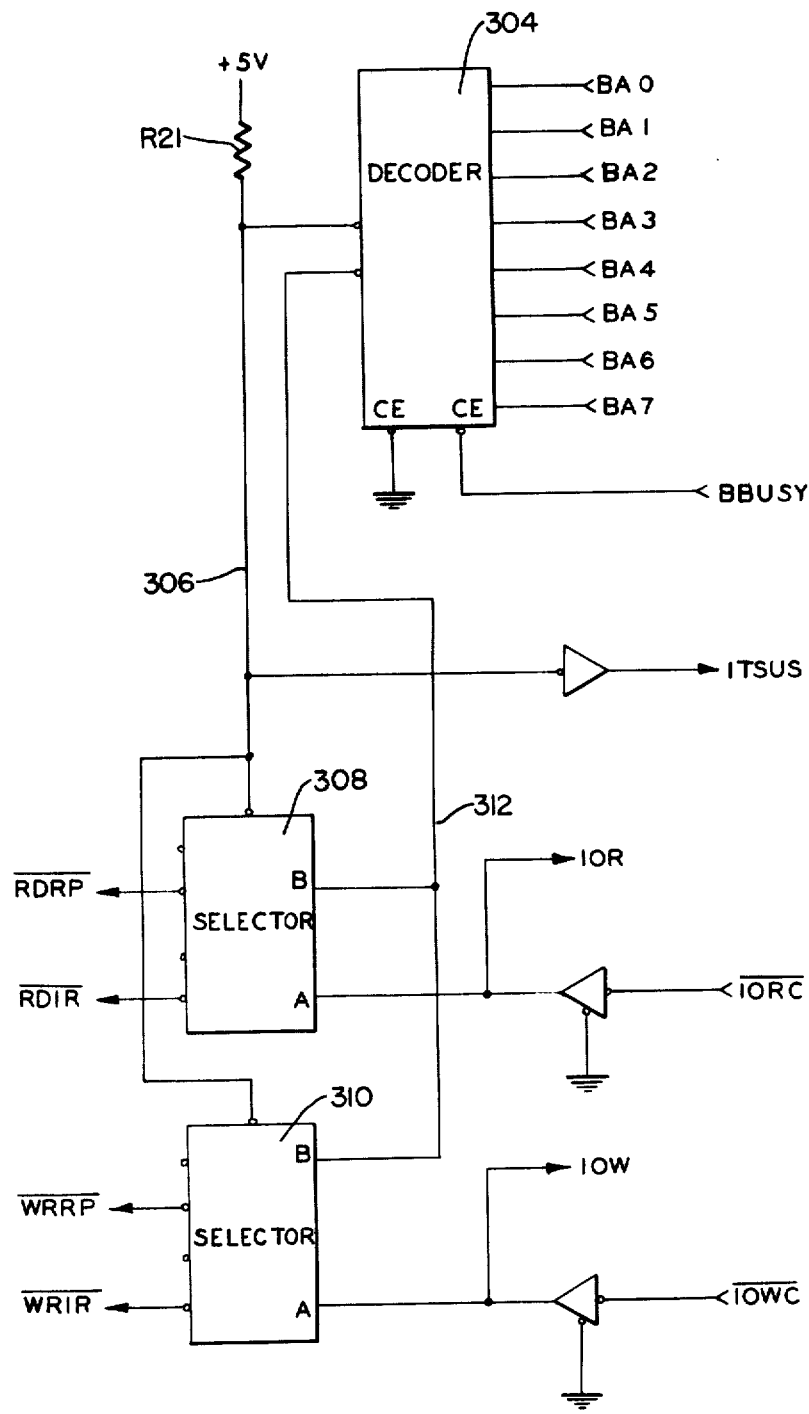
FIG. 16 is a schematic diagram of one embodiment of the interprocessor address decoder and strobe generator.

To write its response port address into the target processor's response port 300, the calling processor places the address of the target CPU's response port onto bus address lines BA0-BA7, generates an I/O write command IOWC, and places its own response port address onto bus data lines BD0-BD7. Referring to FIG. 16, the address lines BA0-BA7 are decoded by PROM I/O address decoder 304. Output line 306 from decoder 304 is coupled to the enabling inputs of selectors 308 and 310. Output line 312 from decoder 304 is coupled to one select input of each of selectors 308 and 310. The other select input of selector 308 is coupled to an I/O read command signal IORC, whereas the other select input of selector 310 is coupled to the I/O write command signal IOWC. Thus, selector 310 will provide a write response port output WRRP upon receipt of an I/O write command IOWC and an appropriate signal on decoder line 312 indicating that the response port address of the target processor has been received over bus data lines BA0–BA7.

The write response port signal WRRP is coupled to flip flop 316 in FIG. 12. If flip flop 316 has not been set by another processor's communication attempt, flip flop 316 will change state. The Q output of flip flop 316 is coupled to an enabling input of response port 300 over line 318. Thus, if response port 300 already has an address contained therein, the new address from the calling processor will not be accepted. Otherwise, the address of the calling processor's response port will be written into response port 300 of the target CPU. In this example, response port 300 is a component No. 74LS373 latch.

Figure 17:
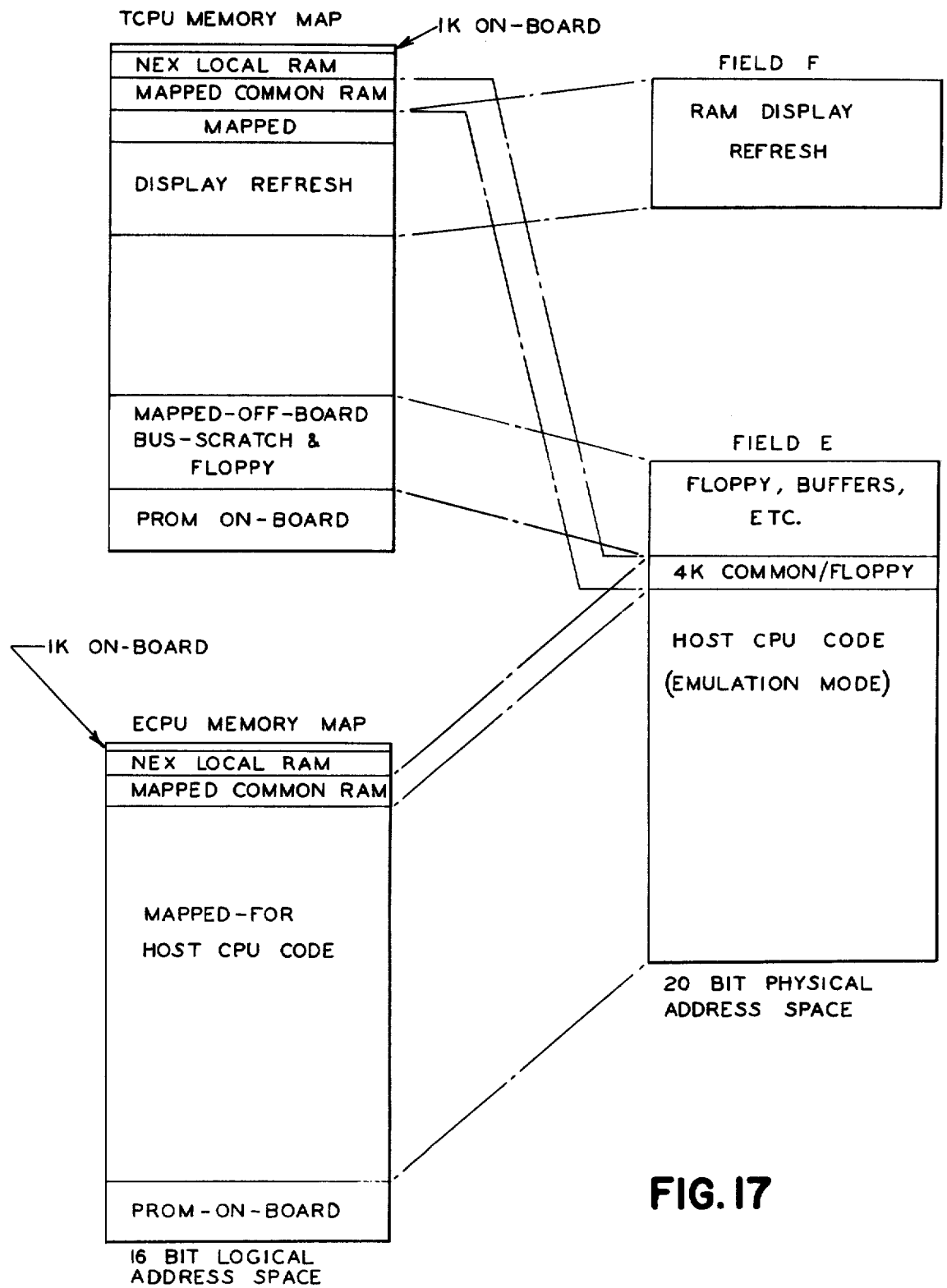
FIG. 17 is a logical to physical memory map showing memory address location layouts for the terminal processor and emulator processor.

The next step is for the calling CPU to read the response port contents of the target CPU to determine if the calling processor's response port address has been accepted by the target CPU's response port 300. This is accomplished by placing an I/O read command IORC over bus 20 which causes selector 308 (FIG. 16) to provide a read response port output signal RDRP. The read response port signal RDRP is coupled to an output enabling input of response port 300 (FIG. 12) such that the calling processor may read the contents of response port 300 over bus data lines BD0–BD7. Unless the calling processor reads the address that it attempted to place into response port 300, it must try again to interrupt the target processor. If the calling processor reads the correct address, it then progresses to the next portion of the cycle in which the calling CPU places an eight bit vector into interrupt register 302 of the target processor. This is accomplished by placing the address of interrupt register 302 of the target CPU onto bus address lines BA0–BA7, generating an I/O write command IOWC, and placing the interrupt vector on the bus data lines BD0–BD7. The selector 310 of FIG. 16 interprets the information and generates a write interrupt register signal WRIR. The write interrupt register signal WRIR is coupled to an enabling input of interrupt register 302 (FIG. 12) such that the vector may be latched into register 302 which is also a No. 74LS373 latch. The multibit vector includes 4 bits to specify the type of the interrupt and 4 bits to point to a packet in common memory 26 (FIG. 1) which is accessible by both TCPU 22 and ECPU 24. FIG. 17 shows the memory address lay out of memory mapping PROM 74 on both TCPU 22 and ECPU 24. It can be seen that if the microprocessor in either TCPU 22 or ECPU 24 generates a specified range of addresses, the memory mapping PROM 74 therein will address selected portions of memory in off board expansion memory 26.

The write interrupt register signal WRIR is also coupled to flip flop 320 in FIG. 12(C) whose output IPINT is coupled through inverter 322 to generate a microprocessor interrupt signal INT. This causes the microprocessor 60 to interrupt and read the status of status register 98 (FIG. 12B) which has also been loaded by the interprocessor interrupt signal IPINT. The target CPU then reads the contents of its interrupt register 302 and performs an interrupt service routine associated with the contents of interrupt register 302. At the end of the interrupt service routine, the routine causes the target processor to generate an interprocessor interrupt enable signal IPIE which is coupled to the reset and D inputs to flip flop 316. Accordingly, the Q output of flip flop 316 goes low thereby unlocking response port enabling line 318 so that response port 302 can receive new data signaling a new interprocessor interrupt cycle.

This feature of this invention finds particular utility in a multiprocessor system using distributive processing techniques. While this example has been limited to showing interprocessor communication between only two processors, it is readily adaptable to systems having many more independent processor modules. Regardless of the number of processors in the system, only that processor which has read its own response port address from the response port 300 of the target processor will subsequently generate the vector to be placed into interrupt register 302 of the target processor. In other words, once the response port 300 of the target CPU is locked, no other interprocessor interrupt is permitted.

VI. EMULATOR ENHANCEMENT

In the preferred embodiment of this invention, ECPU 24 is used as an emulator processor which emulates a host system such as a well known NOVA computer system. A NOVA system utilizes a sixteen bit instruction code format whereas the ECPU 24 uses an eight bit microprocessor 60. Accordingly, system 10 may operate under the control of 16 bit instructions from a NOVA host computer coupled to system 10 through data terminal multiplexer 30 in local central group interface 28. Alternatively, system 10 may be driven by the sixteen bit NOVA instruction code on floppy disk 18 which is coupled to system 10 through controller 38. This permits system 10 to be programmed with substantially the same software that is used to program a NOVA computer thereby decreasing costs since the same software is compatible on both systems.

Figure 18:
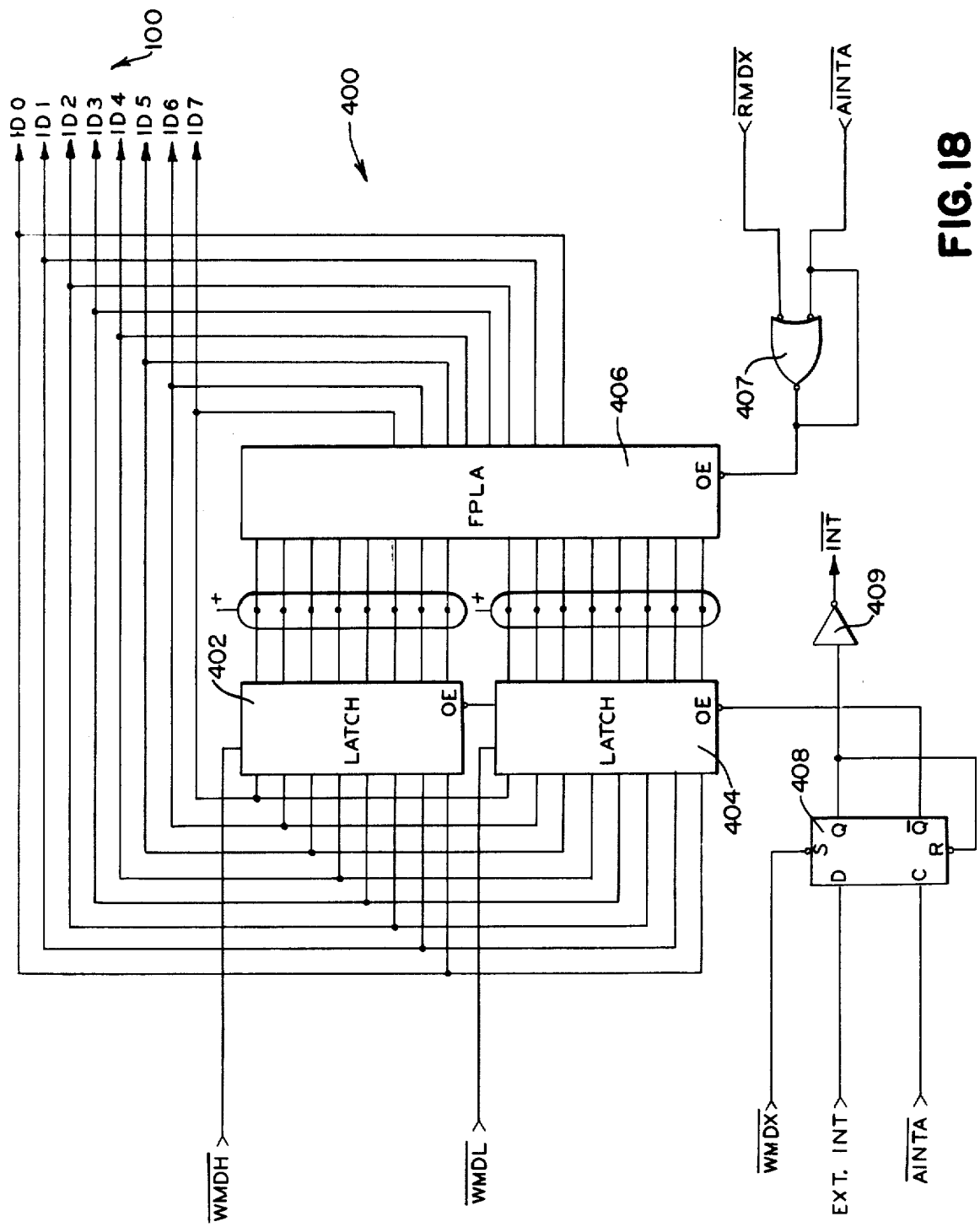
FIG. 18 is a schematic diagram of one embodiment of the macro instruction decoder used in the emulator processor.

In any event, the sixteen bit NOVA code instructions are loaded into memory diskette controller 38 such that they are placed in two successive eight bit address locations in RAM memory 26. The schematic diagram of ECPU is substantially the same as that of TCPU 22. The one exception is that the enhancement circuitry 400 of FIG. 18 is substituted in place of vector register 92 which is shown most clearly in FIGS. 2 and 12. Enhancement circuitry 400 includes two eight bit data latches 402 and 404 having corresponding inputs coupled to one of the eight bit internal I/O data lines 100. The outputs of latches 402 and 404 are coupled to a field programmable logic array (FPLA) 406. The eight output lines of FPLA 406 are coupled back to the I/O data lines 100.

In operation, the ECPU 24 determines the state of the emulated NOVA program counter. Based upon that state, microprocessor 60 determines where the two adjacent eight bit instructions in memory 26 are located. The first eight bit address location N is loaded into the accumulator (not shown) of microprocessor 60 which subsequently generates an I/O write operation to load latch 402 by placing the first eight bits of the sixteen bit instruction on I/O lines 100, and by the I/O mapping and decoder logic 84 (FIG. 11) generating a write micro high signal WMDH. Microprocessor 60 then provides a memory read instruction to address location N+1 which is loaded into the accumulator. An I/O instruction WMDL is then generated to load the second eight bit portion of the sixteen bit code into latch 404. Microprocessor 60 then generates, via logic 84, a write macro instruction WMDX which sets flip flop 408. The Q output of flip flop 408 is coupled to the output enable inputs of latches 402 and 404 such that their outputs are simultaneously coupled to the inputs of FPLA 406. An eight bit vector is generated by FPLA 406 as a function of the sixteen bit instruction code contained in latches 402 and 404. Thus, the sixteen bit code is converted by FPLA 406 into an eight bit format compatible with the eight bit microprocessor 60 in ECPU 24.

The setting of flip flop 408 also generates an interrupt signal INT which causes microprocessor 60 to put the current contents of its program counter onto a stack. The current contents of the I register (not shown) of microprocessor 60 is concatenated with the eight bit vector on I/O data lines 100 thereby pointing the microprocessor 60 to a particular address location (off board or on board) for carrying out an instruction associated with the particular sixteen bit NOVA code. However, the instruction will be carried out using an eight bit language which is compatible with the eight bit microprocessor 60 despite the fact that the originating instructions are in a sixteen bit language. After the interrupt service routine is completed, a pop instruction is done to resume normal microprocessor 60 operation at the point where it left off prior to being interrupted.

Thus, it can be seen that enhancement circuitry 400 readily permits system 10 to be operated from sixteen bit instructions, if desired, without substantial software overhead which would otherwise be necessary to decode the sixteen bit NOVA instructions. Instead, this feature of this invention provides this capability only at the cost of providing readily available latches 402 and 404, and FPLA 406 which decodes the outputs of the latches 402 and 404 to provide the eight bit vector. Merely by changing the contents of FPLA 406, a wide variety of different 16 bit software codes can be used by system 10.

I claim:

1. A modular data processing system having a plurality of discrete functional modules, said system comprising:
    a first central processing unit (CPU) (22) on one circuit board;
    at least one slave module (24, 26, 28, 32, 36) on another circuit board;
    a system bus (20) to which the circuit boards of the first CPU and slave module are pluggably connected, operative to provide a communication link between the CPU and slave module;
    CPU bus interface means (40) on said one circuit board for supplying address, data, and command signals over the bus to the slave module;
    slave module bus interface means (171) on said another circuit board for supplying an operation acknowledge signal to the CPU over the bus after a predetermined delay time associated with the time necessary for the slave module to complete a particular command operation; and
    bus time out means (110) in the CPU on said one circuit board for detecting when the operation acknowledge signal has not been received from the slave module over the bus within a predetermined period of time.

2. The system of claim 1 wherein said system bus includes a plurality of command lines (168), each line associated with a particular operation, said system bus having a plurality of address lines (BA0–19); and
    wherein said slave bus interface means includes delay time generator means (172) which is initialized upon detection of a command signal over the system bus, said delay means providing an output after a predetermined time period from receipt of a command signal; said slave bus interface means further including an operation acknowledge signal generating means (176); and means (166) for energizing said signal generating means upon detection of a command operation over the system bus, an address corresponding to the particular slave module, and an output from said delay means thereby asserting the operation acknowledge signal.

3. The system of claim 2 wherein said slave module bus interface means further comprises visual indication means (178) coupled to the output of said operation acknowledge signal generating means whereby to provide a visual indication to a service technician of improper system operation.

4. The system of claim 3 wherein said slave module interface means further comprises:
    means (170) coupled to said generating means for deasserting said operation acknowledge signal after a selected period of time.

5. The system of claim 4 wherein said CPU bus interface means includes busy signal generating means (144, 146) for generating a bus busy signal over the system bus thereby preventing other modules from gaining access to the bus, said bus busy signal being generated before said address, data and command signals are supplied over the bus to the slave module; and
    means (192) for deasserting said bus busy signal only after deassertion of said operation acknowledge signal from the slave module whereby further bus operations are permitted.

6. The system of claim 5 wherein said CPU bus interface means further comprises:
    means (179) connected to a portion of said busy signal generating means (144, 146) for providing a visual indication of the generation of said bus busy signal whereby service personnel may readily observe the cause of improper system operation.

7. The system of claim 1 wherein said bus time out means comprises:
    a counter (150) having an input, an output, and an enabling means; said CPU operative for loading a predetermined bus time out delay count through the input of said counter, said CPU bus interface means providing an enabling signal (RQBUS) to said counter enabling input to begin the counting thereof after the CPU has accessed the bus, and said counter providing an output signal (CNTDN) after said counter has timed out.

8. The system of claim 7 wherein said CPU includes a microprocessor (60) having N address lines, and wherein said system bus (20) includes more than N address lines, said CPU further comprising:
    memory mapping means (74) coupled between selected address lines from the microprocessor and selected address lines of the system bus, operative to decode the signals on the microprocessor address lines and generate related signals on a greater number of output lines which are coupled to the address lines of the system bus thereby expanding the number of addressable system locations that would otherwise be accessible by the CPU.

9. The system of claim 8 wherein said memory mapping means is a programmable read only memory.

10. The system of claim 8 wherein said memory mapping means additionally provides a board select signal (OFF BOARD) for indicating whether the address desired to be accessed by the CPU microprocessor is on the same circuit board as the CPU or on a different circuit board.

11. The system of claim 10 wherein said CPU further comprises:
   on board memory means (66, 68) on the same circuit board as the CPU and directly coupled to data and address lines from said microprocessor; and
   buffer means (64, 78, 80) connected between said on board memory means (66, 68) and the system bus (20) for isolating said on board memory means from said system bus.

12. The system of claim 11 wherein said on board memory means includes a plurality of discrete memory devices; and wherein said CPU further comprises:
   field decoder means (104) coupled to said board select signal from said memory mapping means, operative for selectively enabling one of the on board memory devices when said board select signal indicates that the CPU microprocessor desires to access on board memory.

13. The system of claim 12 wherein said board select signal and a given number of output lines (MA16-18) from the memory mapping means are coupled to select inputs of said field decoder means, wherein said field decoder is enabled when said board select signal indicates on board memory selection, with said given output lines from the memory mapping means providing a code for enabling a particular on board memory device, and wherein said output lines from the memory mapping means otherwise provide address signals to the system bus for accessing off board memory locations.

14. The system of claim 13 wherein said on board memory devices include at least one random access memory (RAM) (66) and at least one programmable read only memory (PROM) (68).

15. The system of claim 14 wherein a given subset of the output lines (MA14-15) from said memory mapping means generates RAM select or PROM select signals providing an indication of whether on board RAM or PROM is to be accessed so that CPU operation may be adjusted accordingly.

16. The system of claim 15 which further comprises:
   a controller means (70) having a plurality of inputs connected to devices (60, 74, 104, 110) of said CPU (20) and outputs, operative to control system operation via its output lines depending upon the status of its input lines.

17. The system of claim 16 wherein said controller means comprises a programmable logic array (PLA).

18. The system of claim 17 wherein said controller means provides an output signal (ZWAIT) to said microprocessor for placing it into a waiting state for a selected period of time depending upon whether on board RAM or PROM is to be accessed as determined by the states of said RAM select or PROM select signals from the memory mapping means.

19. The system of claim 18 wherein said controller means includes a group of multipurpose output lines (108) which are coupled both to the input of said counter of said bus time out means and to command lines of said system bus.

20. The system of claim 19 wherein said controller means has a mode select input (FPLAMOD) operative to condition the multipurpose output lines of said controller to provide selected count signals to the input of said counter during one mode of operation, and to provide command signals to said system bus during another mode of operation.

21. The system of claim 20 wherein the count signals supplied by said multipurpose output lines from the controller in said one mode is determined by the state of said RAM select, PROM select, and board select signals from said memory mapping means which are coupled to inputs of said controller means.

22. The system of claim 21 wherein the output of said counter is coupled to an input of said controller means, with said controller taking the microprocessor out of the waiting state when the counter times out after an on board memory access operation.

23. The system of claim 21 wherein said CPU bus interface means generates a bus done signal in response to a received operation acknowledge signal from said slave module, said bus done signal being coupled to an input of said controller means;
   said output of said counter of said bus time out means being coupled to an input of said controller means, said output providing a count done signal indicating that the bus time out delay has elapsed, said bus time out delay being loaded into said counter by said multipurpose output lines of said controller means during said one mode of operation;
   whereby said controller means detects the failure of said slave module to generate the operation acknowledge signal within said bus time out delay period when said count done signal from said counter means occurs before the bus done signal from said CPU bus interface means.

24. The system of claim 23 wherein said controller means generates an interrupt signal for interrupting further microprocessor operation when said count done signal is received before said bus done signal which is representative of a bus time out fault condition.

25. The system of claim 24 wherein said controller means provides an output signal for initiating a loading of an error signal into a fault register means (90) in the event of a bus time out fault, and wherein said interrupt signal from said controller means instructs the microprocessor to interrogate the status of said fault register.

26. The system of claim 25 wherein said microprocessor stores information relating to the system status just prior to the detection of the bus time out fault whereby to facilitate easy detection by service personnel of the operation which caused the fault.

27. The system of claim 1 further including a plurality of slave modules having vectored interrupt circuitry (210) comprising:
   latch means (240) coupled to data lines on the system bus, said latch containing a predetermined multibit code defining a vector associated with a particular memory location accessible by the CPU;
   an interrupt priority line (212) coupled in a daisy chain fashion to other slave modules in the system;
   first storage device means (214) for asynchronously storing an internally generated interrupt request from the slave module;
   second storage device means (224) having an input coupled to the output of said first storage device, an output, and a clock input operative to transfer information on the second storage device input to its output upon receipt of a signal at the clock input thereof;
   interrupt line gating means (226) having inputs coupled for receipt of said interrupt priority line and the output from said second storage device, said interrupt gating means having an output adapted to be coupled to the input of the interrupt line of the next slave module; and means for coupling a clock signal (M1) from the CPU to the clock input of said second storage device whereby to control the state of the interrupt priority lines of the other slave modules.

28. The system of claim 27 wherein said vectored interrupt circuitry further comprises:

enabling gating means (236) having a plurality of inputs, and an output coupled to said latch, operative to control the placement of said vector contained in the latch over the system bus to the CPU depending upon the state of the signals at the enabling gating means input, said enabling gating means inputs being coupled to the output of said second storage device, the interrupt priority line, and an acknowledge signal (INTA) from said CPU.

29. The system of claim 28 wherein said clock signal from said CPU occurs before the acknowledge signal from the CPU whereby the state of said second storage device is changed before the enabling gating means is enabled so that the interrupt priority lines of the other modules may stablize.

30. The system of claim 29 which further comprises:

interrupt vector signal request means (216) coupled to the output of said first storage device, operative to provide an interrupt vector request signal (INT-V) over the system bus to said CPU;

said CPU responding to said interrupt vectored request signal by sequentially generating said clock and interrupt acknowledge signal on the system bus to the vectored interrupt circuitry in the slave modules whereby said priority gating means inhibits the daisy chain priority lines of the other modules when the second storage device is clocked by the clock signal from the CPU and wherein said enabling gating means couples the vector in the latch to the CPU upon receipt of a subsequently received interrupt acknowledge signal.

31. The system of claim 1 which includes first (24) and second (22) CPU's, each CPU having interprocessor communication circuitry comprising:

interrupt register means (302) and response port means (300) in each of the CPU's;

means (IOWC) in the first CPU for writing a given code into the response port of the second CPU;

means (IORC) in the first CPU for reading the code in the response port of the second CPU;

means (IOWC) in the first CPU for generating a multi-bit vector only if said first CPU has read said code from the response port of the second CPU;

means (WRIR) in the second CPU for loading said multibit vector into its interrupt register; and means (RDIR) in the second CPU for causing the second CPU to read the vector stored in said interrupt register whereby said second CPU is caused to perform an instruction associated with said multi-bit vector.

32. The system of claim 31 wherein said second CPU includes means (316) for selectively preventing further codes to be written into said response port once it has initially been written into; and means (IPIE) in the second CPU for unlocking its response port so that it can receive more codes once the second CPU has completed the execution of the instruction associated with the multi-bit vector.

33. The system of claim 32 which further comprises:

a slave module (26) containing a memory with a plurality of memory locations, with a predetermined range of said memory locations being commonly accessible by both said first and second CPU's whereby said second CPU may place data therein in response to the instruction associated with said multi-bit vector so that the first CPU may thereafter read it for further use.

34. The system of claim 1 which further comprises a second CPU means (24) connected to said bus for emulating a processor normally operated by instructions having a dissimilar word length than said second CPU.

35. The system of claim 34 wherein said second CPU utilizes an eight bit microprocessor (60) to emulate a sixteen bit processor such that eight bit oriented system components may be operated from externally generated sixteen bit instruction code.

36. The system of claim 35 wherein said second CPU includes enhancement means (400) for facilitating prompt execution of sixteen bit instructions on said eight bit microprocessor; said enhancement means comprising:

first latch means (402) for storing the first eight bits of the sixteen bit instruction;

second latch means (404) for storing the subsequent eight bits of the sixteen bit instruction;

a programmable logic array (406), operative for simultaneously receiving the eight bit codes stored in each of said latches and converting them into an eight bit pointer to a memory location containing an instruction executable by the eight bit microprocessor.

37. The system of claim 36 which further comprises:

means (408) for simultaneously coupling the outputs of said first and second latches to inputs of said programmable logic array;

means (409) for generating an interrupt of said second CPU microprocessor and causing said microprocessor to read the output of said programmable logic array.

38. In a data processing system having a plurality of functional circuit board modules communicating with each other over a system bus, with one of the modules containing a central processing unit (CPU), the improvement comprising:

a microprocessor (60) on the CPU circuit board, said microprocessor having a given number of address lines;

said system bus (20) having a greater number of address lines than the address lines from the microprocessor; and memory mapping means (74) on the CPU circuit board coupled between selected address lines from the microprocessor and selected address lines of the system bus, operative to decode the signals on the microprocessor address lines and generate related signals on a greater number of output lines which are coupled to the address lines of the system bus thereby expanding the number of addressable system locations that would otherwise be accessible by the CPU.

39. The improvement of claim 38 wherein said memory mapping means is a programmable read only memory.

40. The improvement of claim 39 wherein said memory mapping means additionally provides a board select signal (OFF BOARD) for indicating whether the address desired to be accessed by the CPU microprocessor is on the same circuit board as the CPU or on a different circuit board.

41. The improvement of claim 40 wherein said CPU further comprises:
   on board memory means (66, 68) on the same circuit board as the CPU and directly coupled to data and address lines from the microprocessor; and
   buffer means (64, 78, 80) connected between said on board memory means and the bus for isolating said on board memory means from said system bus.

42. The improvement of claim 41 wherein said on board memory means includes a plurality of discrete memory devices and wherein said CPU further comprises:
   field decoder means (104) coupled to said board select signal from said memory mapping means, operative for selectively enabling one of the on board memory devices when said board select signal indicates that the CPU microprocessor desires to access on board memory.

43. The improvement of claim 42 wherein said board select signal and a given number of output lines (MA1-6-18) from the memory mapping means are coupled to select inputs of said field decoder means, wherein said field decoder is enabled when said board select signal indicates on board memory selection, with said given output lines from the memory mapping means providing a code for enabling a particular on board memory device, and wherein said output lines from the memory mapping means otherwise provide address signals to the system bus for accessing off board memory locations as indicated by the state of the board select signal.

44. The improvement of claim 43 wherein said on board memory devices include at least one random access memory (RAM) (66) and at least one programmable read only memory (PROM) (68).

45. The improvement of claim 44 wherein a given subset (MA14-15) of the output lines from said memory mapping means generates RAM select or PROM select signals depending on whether said RAM or PROM is to be accessed so that the CPU operation may be adjusted accordingly.

46. The improvement of claim 45 which further comprises:
   controller means (70) having a plurality of inputs connected to devices (60, 74, 104, 110) of said CPU (20) and outputs, operative to control system operation via its output lines depending upon the status of its input lines.

47. The improvement of claim 46 wherein said controller means comprises a programmable logic array (PLA).

48. The improvement of claim 47 wherein said controller means provides an output signal (ZWAIT) to said microprocessor for placing it into a waiting state for a selected period of time depending upon whether on board RAM or PROM is to be accessed as determined by the states of said RAM select or PROM select signals from the memory mapping means.

49. The improvement of claim 48 wherein said controller means includes a group of multipurpose output lines (108) which are coupled to an input of a counter (50) and to command lines (168) of said system bus; said controller means having a mode select input (FPLAMOD) operative to condition the multipurpose output lines of said controller to provide selected count signals to said counter during one mode of operation, and to provide command signals to said system bus during another mode of operation.

50. The improvement of claim 49 wherein the content of said count signals supplied by said multipurpose controller output lines in said one mode is a function of the state of said RAM select and PROM select signals from said memory mapping means which are coupled to said input of said controller means.

51. The improvement of claim 50 wherein an output (CNTDN) of said counter is coupled to an input of said controller means, with said controller taking the microprocessor out of the waiting state when the counter times out after an on board memory access operation.

52. In a data processing system having a plurality of functional circuit board modules including a plurality of slave modules communicating with each other over a system bus, with one of said modules including a central process unit (CPU) utilizing a microprocessor, wherein the improvement comprises vectored interrupt circuitry (210) for the slave modules in the system to permit efficient prioritized communication between the CPU and selected slave modules, said vectored interrupt circuit including:
   latch means (240) coupled to data lines on the system bus, said latch containing a predetermined multibit code defining a vector associated with a particular memory location accessible by the CPU;
   an interrupt priority line (212) coupled in a daisy chain fashion to other slave modules in the system;
   first storage device means (214) for asynchronously storing an internally generated interrupt request from the slave module;
   second storage device means (224) having an input coupled to the output of said first storage device, an output, and a clock input operative to transfer information on the second storage device input to its output upon receipt of a signal at the clock input thereof;
   interrupt line gating means (226) having inputs coupled for receipt of said interrupt priority line and the output from said second storage device, said interrupt gating means having an output adapted to be coupled to the input of the interrupt line of the next slave module; and
   means for coupling a clock signal from the CPU to the clock input of said second storage device whereby to control the state of the interrupt priority lines of the other slave modules.

53. The improvement of claim 52 wherein said vectored interrupt circuitry further comprises:
   enabling gating means (236) having a plurality of inputs, and an output coupled to said latch, operative to control the placement of said vector contained in the latch over the system bus to the CPU depending upon the state of the signals at the enabling gating means inputs, said enabling gating means inputs being coupled to the output of said second storage device, the interrupt priority line, and an acknowledge signal (INTA) from said CPU.

54. The improvement of claim 53 wherein said clock signal from said CPU occurs before the acknowlege signal from the CPU whereby the state of said second storage device is changed before the enabling gating means is enabled so that the interrupt priority lines of the other modules may stabilize.

55. The improvement of claim 54 which further comprises:
   interrupt vector signal request means (216) coupled to the output of said first storage device, operative to provide a vectored interrupt request signal (INT-V) over the system bus to said CPU;
   said CPU responding to said vectored interrupt request signal by sequentially generating said clock and interrupt acknowledge signals on the system bus to the vectored interrupt circuitry in the slave modules whereby said priority gating means inhibits the daisy chain priority lines of the other modules when the second storage device is clocked by the clock signal from the CPU and wherein said enabling gating means couples the vector in the latch to the CPU upon receipt of a subsequently received interrupt acknowledge signal.

56. In a data processing system (10) having a plurality of functional circuit board modules (24, 26, 28, 32, 36) communicating with each other over a system bus (20), with one of said modules including a central processing unit (CPU) (22) utilizing a microprocessor (60), wherein the improvement comprises vectored interrupt circuitry (210) for selected slave modules in the system to permit efficient prioritized communication between the CPU and the slave modules, said vectored interrupt circuitry including:
   latch means (240) coupled to data lines on the system bus, said latch containing a predetermined multibit code defining a vector associated with a particular memory location accessible by the CPU;
   an interrupt priority line (212) coupled in a daisy chain fashion to other slave modules in the system;
   first storage device means (214) for asynchronously storing an internally generated interrupt request from the slave module;
   vectored interrupt request generating means (216) coupled to the output of said first storage device, operative to initiate an interrupt request of said CPU microprocessor;
   second storage device means (224) having an input coupled to the output of said first storage device, an output, and a clock input operative to transfer information on the second storage device input to its output upon receipt of a signal at the clock input thereof;
   means in the CPU for successively generating a clock (M1) signal and an interrupt acknowledge (INTA) signal over the system bus to the slave module vectored interrupt circuitry;
   interrupt line gating means (226) having inputs coupled for receipt of said interrupt priority line and the output from said second storage device, said interrupt gating means having an output adapted to be coupled to the input of the interrupt lines of another slave module;
   enabling gating means (236) having a plurality of inputs coupled for respective receipt of signals on said interrupt priority line, the output of said second storage device, and said interrupt acknowledge signal;
   whereby said second storage device changes state upon receipt of said clock signal thereby activating said priority line gating means to inhibit the daisy chain priority lines of the other slave modules and wherein said enabling gating means couples the multibit vector contained in the latch to the CPU upon receipt of the subsequently received interrupt acknowledge signal, said vector thus being supplied only after sufficient time has elapsed for the daisy chain priority lines to stablize.

57. A method of prioritizing interrupt requests from a plurality of slave modules in a data processing system having a central processing unit (CPU) module, said modules communicating with each other over a system bus, said method comprising:
   linking said slave modules together with a priority line in order of descending priority;
   generating an interrupt request of said CPU from one of said slave modules;
   responding to said interrupt request by the CPU generating sequential first and second signals to said slave modules;
   changing the state of the priority lines of the slave modules not requesting an interrupt upon detection of said first responsive signal from the CPU and simultaneously storing an indication that said one module has requested an interrupt of the CPU; and
   placing data on the system bus from said one module upon receipt of the subsequently received second signal from the CPU.

58. The method of claim 57 which further comprises:
   storing selected multibit vectors in a register of each of the slave modules, said vector containing data associated with a particular instruction for said CPU to execute, with the vector of the particular slave module whose interrupt priority line has not been changed and which has stored its interrupt request signal upon receipt of the first CPU responsive signal being placed onto the system bus when said second CPU responsive signal is received.

59. In a data processing system having a plurality of distributed central processing units (CPU's) connected over a bus (20), said system having means by which a calling CPU may communicate with a target CPU, the improvement comprising:
   a pair of storage devices (300, 302) in each of the CPU's in the system, said storage devices serving as a response port and interrupt register, respectively, which are commonly accessible by all of the CPU's in the system;
   means (IOWC) in the calling CPU to write a given code into the response port of the target CPU;
   means (316) in the target CPU for preventing a difference CPU from writing into the response port of the target CPU once it has been written into;
   means (IORC) in the calling CPU for reading the code in the response port of the target CPU;
   means (IOWC) in the calling CPU for generating a multibit vector only if the calling CPU has read the same code that it previously attempted to write into the response port of the target CPU;
   loading means (WRIR) in the target CPU for loading said multi-bit vector into its interrupt register; and
   means (IPIE) in the target CPU for reenabling its response port to receive codes from other CPU's once the target CPU has completed the execution of an instruction associated with the vector in its interrupt register.

60. The improvement of claim 59 wherein said target CPU further comprises:
   means (320) coupled to said loading means in the target CPU for interrupting further processor operation upon detection of said interrupt register being loaded, with said target CPU then executing an instruction associated with the vector contained in its interrupt register.

61. The improvement of claim 59 wherein the system includes a slave module (26) connected to the bus and containing a memory with a plurality of memory locations, with a predetermined range of memory locations being commonly accessible by all of the CPU's in the system.

62. A method of controlling interprocessor communication between a calling central processing unit (CPU) and a target central processing unit (CPU) in a data processing system having a plurality of CPU's, said method comprising:
  writing a preselected code into a first storage device in the target CPU by the calling CPU;
  reading the contents of said first storage device by the calling CPU;
  placing a multibit vector into a second storage location in said target CPU only if said calling CPU has read said preselected code from the first storage device in the target CPU; and
  causing the target CPU to interrupt further operation and execute an instruction associated with the multibit vector in said storage device.

63. The method of claim 62 which further comprises:
  preventing other CPU's from writing into the first storage device of the target CPU once it has been written into; and
  reenabling the first storage device so that it can receive codes from other CPU's once the target CPU has completed the operation associated with the vector.

64. In a data processing system having a central processing unit (CPU) utilizing a microprocessor (60) for emulating another type of processor that operates on software code having a greater number of bits per word than is executable by the microprocessor, wherein the improvement comprises:
  a plurality of latch means (402, 404) for storing data therein associated with a word of software code from said other processor;
  a programmable logic array (406) having a plurality of inputs coupled to said latch means and outputs coupled to internal data lines (100) of said microprocessor; and
  means (408) for simultaneously transferring the contents of said latch means to the inputs of said programmable logic array for generating a word having a number of bits executable by the microprocessor.

65. The improvement of claim 64 wherein said microprocessor operates on eight bit words, and wherein said other processor operates on sixteen bit words.

66. The improvement of claim 65 wherein said storage device further comprises:
  first latch means (402) for successively storing the first eight bits of each of the sixteen bit words;
  second latch means (404) for successively storing the subsequent eight bits of each of the sixteen bit words; and
  means (408) for simultaneously transferring the contents of both of said latches to the inputs of said programmable logic array for conversion into an eight bit pointer to a memory location containing an instruction executable by the microprocessor.

67. The improvement of claim 66 which further comprises:
  means (409) connected to said microprocessor for interrupting further microprocessor operation upon transfer of said latches into the programmable logic array, with said microprocessor subsequently reading the contents of said programmable logic array and executing an instruction associated therewith.

* * * * *